US007434466B2

(12) United States Patent
Ito

(10) Patent No.: US 7,434,466 B2
(45) Date of Patent: Oct. 14, 2008

(54) GYRO SENSOR

(75) Inventor: Hajime Ito, Ichinomiya (JP)

(73) Assignee: Denso Corporation, Kariya (JP)

( * ) Notice: Subject to any disclaimer, the term of this patent is extended or adjusted under 35 U.S.C. 154(b) by 241 days.

(21) Appl. No.: 11/297,647

(22) Filed: Dec. 9, 2005

(65) Prior Publication Data

US 2006/0123908 A1    Jun. 15, 2006

(30) Foreign Application Priority Data

Dec. 10, 2004    (JP)    ............................. 2004-358973

(51) Int. Cl.
*G01P 15/125*    (2006.01)

(52) U.S. Cl. ................ 73/514.32; 73/504.12; 73/503.3; 73/514.16; 73/514.01

(58) Field of Classification Search .............. 73/514.32, 73/514.29, 503.3, 504.02, 504.03

See application file for complete search history.

(56) References Cited

U.S. PATENT DOCUMENTS

| 5,313,835 | A | * | 5/1994 | Dunn ....................... 73/514.15 |
| 5,691,471 | A | * | 11/1997 | Okazaki et al. .......... 73/504.04 |
| 5,806,364 | A | | 9/1998 | Kato et al. |
| 5,948,981 | A | * | 9/1999 | Woodruff ................. 73/514.29 |
| 6,018,997 | A | * | 2/2000 | Kumada et al. .......... 73/504.16 |
| 6,122,961 | A | | 9/2000 | Geen et al. |
| 6,481,284 | B2 | | 11/2002 | Geen et al. |
| 6,487,908 | B2 | | 12/2002 | Geen et al. |
| 6,505,512 | B2 | | 1/2003 | Geen et al. |
| 6,619,121 | B1 | * | 9/2003 | Stewart et al. ........... 73/504.02 |
| 6,672,161 | B2 | * | 1/2004 | Sakai et al. ............... 73/514.32 |
| 6,684,698 | B2 | * | 2/2004 | Geen et al. ............... 73/504.14 |
| 2003/0200806 | A1 | | 10/2003 | Geen et al. |
| 2004/0237651 | A1 | * | 12/2004 | Furuichi .................. 73/514.32 |

FOREIGN PATENT DOCUMENTS

| JP | A-07-225162 | 8/1995 |
| JP | 9-170927 | 6/1997 |
| JP | A-11-044540 | 2/1999 |
| JP | 2000-81335 | 3/2000 |
| JP | 2001-153659 | 6/2001 |
| JP | 2001-515201 | 9/2001 |
| JP | A-2004-053396 | 2/2004 |

OTHER PUBLICATIONS

"Single-Chip Surface Micromachined Integrated Gyroscope With 50°/h Allan Deviation" written by John A. Geen et al.;"IEEE Journal of Solid-State Circuits", vol. 37, No. 12; Dec. 2002.
"±150°/s Single Chip Yaw Rate Gyro with Single Conditioning, ADXRS150" by Analog Devices, Inc.; 2003.
Office Action dated Oct. 16, 2007 in corresponding Japanese Patent Application No. 2004-358973 (and English translation).

* cited by examiner

*Primary Examiner*—Hezron E. Williams
*Assistant Examiner*—Gunnar J Gissel
(74) *Attorney, Agent, or Firm*—Posz Law Group, PLC

(57) ABSTRACT

The electrostatically-driven/capacitance-detection type gyro sensor has a sensing element including a movable part, the sensitivity of the sensing element and accordingly the sensitivity of a sensor output signal thereof being kept unchanged by controlling the amplitude of displacement or displacing velocity of the movable part and by using a reference voltage independent of variation of a power supply voltage, even there occurs a change in the vibrating state of the movable part due to temperature change or secular variation.

14 Claims, 15 Drawing Sheets

GYRO SENSOR

CROSS-REFERENCE TO RELATED APPLICATION

This application is related to Japanese Patent Application No. 2004-358973 filed on Dec. 10, 2004, the contents of which are hereby incorporated by reference.

BACKGROUND OF THE INVENTION

1. Field of the Invention

The present invention relates to a electrostatically-driven/capacitance-detection type gyro sensor 2. Description of Related Art As one type of the gyro sensor used for sensing angular velocity, there is known a electrostatically-driven/capacitance-detection type gyro sensor. As shown in FIG. 17, the gyro sensor of this type is constituted by a sensing element 101 including a movable part displaceable in a certain plane (referred to as "motion plane" hereinafter), and a detector unit 102 driving the movable part for detecting the angular velocity of rotative motion imparted to the sensing element around an axis orthogonal to the motion plane (refer to Published Japanese Translation No. 2001-515201 of a PCT Application, for example).

The sensing element 101 includes a drive electrode generating an electrostatic force with the movable part to vibrate the movable part along a predetermined direction (refereed to as "driving direction" hereinafter) in the motion plane, a monitor electrode forming a monitoring variable capacitor with the movable part whose capacitance varies depending on the displacement of the movable part along the driving direction, a sense electrode forming a sensing variable capacitor with the movable part whose capacitance varies depending on the displacement of the movable part in the motion plane along a direction orthogonal to the driving direction, and a movable electrode through which the movable part is applied with a bias voltage.

By properly controlling the voltage applied between the movable electrode and the drive electrode, it is possible that the movable part continues to vibrate along the driving direction. If the sensing element 101 is imparted with rotative motion around an axis orthogonal to the motion plane when the movable part is vibrating along the driving direction, the movable part develops vibration in the direction orthogonal to the driving direction by the action of the Coriolis force which depends on the angular velocity of the sensing element 101.

The detector unit 102 includes a reference voltage generating section 108 generating a reference voltage Vref, a high voltage generating section 106 amplifying the reference voltage Vref to generate the bias voltage VK ($=k_{RK} \cdot \text{Vref}$, $k_{RK}$ being the gain of the high voltage generating section 106) to be applied to the movable electrode, a drive buffer 105 generating a sinusoidal drive signal VD(t) having an offset voltage proportional to the reference voltage Vref, a CV (Capacitance to Voltage) converting section 103 generating a monitor signal VM(t) whose voltage level varies depending on the variation of the capacitance of the monitoring variable capacitor (that is, the vibration state of the movable part vibrating under the action of the drive signal), and generating a sense signal VS(t) whose voltage level varies depending on the variation of the capacitance of the sensing variable capacitor (that is, the vibration state of the movable part vibrating under the action of the Coriolis force), a drive signal controlling section 104 controlling the amplitude and phase of the drive signal VD(t) generated by the drive buffer 105 in accordance with the monitor signal generated by the CV converting section 103 such that the vibration of the movable part along the driving direction continues, and a sensor output signal generating section 107 outputting a sensor output signal $V_{YAW}$ that has an offset voltage proportional to the reference voltage Vref and has a voltage level varying depending on the Coriolis force applied to the movable part (that is, the angular velocity of the movable part).

In the gyro sensor having the configuration described above, the drive force driving the movable part depends on the voltage difference between the movable electrode and the drive electrode, and the conversion gain of the CV converting section 103 generating the monitor signal VM(t) and sense signal VS(t) depends on the voltage differences between the movable electrode and the monitor electrode or sense electrode. On the other hand, the gain for converting the rotative motion imparted to the sensing element 101 into the Coriolis force (referred to as "element sensitivity" hereinafter) depends on the vibrating state of the movable part vibrating under the action of the drive force.

Accordingly, if the reference voltage Vref varies depending on the variation of the power supply voltage VCC, the gain for converting the angular velocity of the sensing element 101 into the sensor output signal $V_{YAW}$ (referred to as "sensor sensitivity" hereinafter) changes, since the element sensitivity and the circuit characteristics of the detector unit 102 including the CV converting section 103 change depending on the variation of the power supply voltage VCC.

Accordingly, in order that the sensor output signal $V_{YAW}$ is not affected by the variation of the power supply voltage VCC, the reference voltage generating section 108 is configured to generate the reference voltage Vref by use of a constant voltage not affected by the variation of the power supply voltage VCC, such as a band-gap voltage.

In a microcomputer-based system using such a gyro sensor, it is common that the sensor output signal $V_{YAW}$ outputted from the gyro sensor is converted to a digital signal by use of an A/D converter, and then supplied to a microcomputer.

Generally, in such a system, a reference voltage which the A/D converter uses for performing the A/D conversion is generated by dividing down the power supply voltage VCC. Since the sensor output signal $V_{YAW}$ varies between both polarities with respect to a predetermined offset voltage, the microcomputer processes the digital signal outputted from the A/D converter by using the center value of the output range of the A/D converter as a zero point. Generally, in order to maximize the dynamic range of the sensor output signal $V_{YAW}$, the offset voltage corresponding to the zero point is set at half the power supply voltage VCC.

Accordingly, when the power supply voltage VCC is 5V, the offset voltage thereof is set at 2.5V. As explained above, although the zero point of the sensor output signal $V_{YAW}$ outputted from the gyro sensor is set in accordance with the reference voltage Vref, and is therefore maintained unchanged even if the power supply voltage VCC varies, the zero point recognized by the microcomputer varies in proportion to the power supply voltage VCC. Accordingly, if the power supply voltage VCC deviates from its rated value for some reason, there arises a difference between the zero point recognized by the microcomputer and the zero point of the sensor output signal $V_{YAW}$ outputted from the gyro sensor. This lowers the accuracy of angular velocity detection.

Furthermore, such a system has another problem in that, if the power supply voltage VCC deviates from its rated value, although there occurs no change in the sensor output signal $V_{YAW}$, there occurs a change in the dynamic range of the A/D converter. This causes a change in the incremental value of the sensor output signal $V_{YAW}$ per bit of the digital signal which the A/D converter generates. This changes the conversion ratio of the A/D converter, which also lowers the accuracy of angular velocity detection.

It may occur that the accuracy of the angular velocity detection can be avoided from being lowered if the microcomputer operates to detect the deviation of the power supply voltage VCC or the deviation of the reference voltage Vref due to the deviation of the power supply voltage VCC, and to compensate for the deviation of the zero point or the sensitivity in accordance with the result of the detection. However, this considerably increases the burden of the microcomputer.

SUMMARY OF THE INVENTION

The present invention provides an electrostatically-driven/capacitance-detection type gyro sensor including:
a sensing element having
a movable part displaceable in a motion plane,
a first electrode provided in the movable part and applied with a bias voltage,
a second electrode applied with a drive signal to generate an electrostatic force acting on the movable part in order that the movable part vibrates along a first direction on the motion plane,
a third electrode forming a first variable capacitor with the movable part, a capacitance of the first variable capacitor varying in accordance with a displacement of the movable part along the first direction, and
a fourth electrode forming a second variable capacitor with the movable part, a capacitance of the second variable capacitor varying in accordance with a displacement of the movable part along a second direction on the motion plane, the second direction being orthogonal to the first direction;
a reference voltage generator generating, from a power supply voltage supplied from outside the gyro sensor, a reference voltage which is constant irrespective of variation of the power supply voltage;
a bias voltage generator generating the bias voltage by amplifying the reference voltage;
a capacitance-voltage converter converting the capacitance of the first variable capacitance into a first voltage signal whose voltage level varies following variation of the capacitance of the first variable capacitor, and converting the capacitance of the second variable capacitance into a second voltage signal whose voltage level varies following variation of the capacitance of the second variable capacitor;
a drive signal generator generating the drive signal by amplifying and phase-adjusting the first voltage signal, the drive signal having an offset voltage proportional to the reference voltage; and
a sensor output signal generator generating, from the second voltage signal, a sensor output signal having a magnitude corresponding to the voltage level of the second voltage signal, the sensor output signal having an offset voltage proportional to the power supply voltage.

The gyro sensor of the invention can generate the sensor output signal with a high degree of accuracy, because the element sensitivity of the sensing element and eventually the sensitivity of the sense signal (the second voltage signal) can be kept unchanged by controlling the amplitude of displacement or displacing velocity of the movable part and by using the reference voltage independent of the variation of the power supply voltage, even there occurs a change in the vibrating state of the movable part for some reason such as temperature change or secular variation.

Furthermore, in the gyro sensor of the invention, since not only a zero point (offset voltage) of the sensor output signal but also a target voltage used for amplitude stabilizing control of the movable part varies in proportion to the power supply voltage, even when A/D conversion ratio is changed due to the variation of the power supply voltage, it can be compensated for, because the sensitivity of the sense signal and eventually the sensitivity of the sensor output signal, which has an offset voltage varying in proportion to the power supply voltage, are changed in the same ratio as the change of the power supply voltage.

Accordingly with the present invention, it becomes unnecessary to perform sensitivity adjustment and zero point adjustment on the side of a microcomputer receiving the sensor output signal.

PREFERRED EMBODIMENTS OF THE INVENTION

First Embodiment

Figure 1:
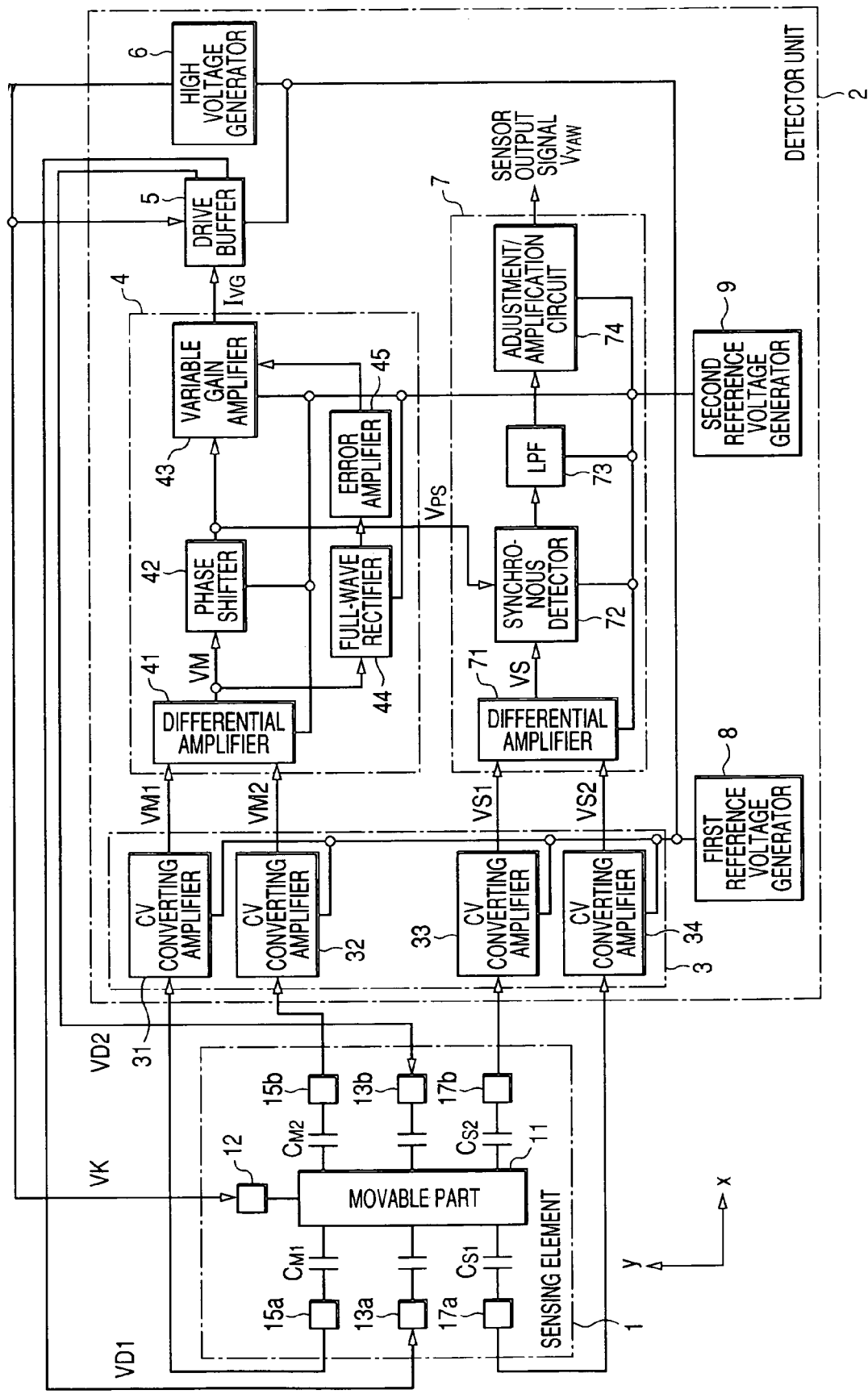
FIG. 1 is a block diagram showing a structure of a gyro sensor according to a first embodiment of the invention.

FIG. 1 is a block diagram showing a configuration of an electrostatically-driven/capacitance-detection type gyro sensor according to a first embodiment of the invention.

This gyro sensor includes a sensing element 1 having a movable part 11 which is movable on a 2-dimensional plane, and a detector unit 2 driving the sensing element 1 and detecting the angular velocity of a rotative motion imparted to the sensing element 1.

The movable part 11 is supported on a substrate mode of a single-crystal silicon material or the like by rectangular beams extending from the four corners of the substrate so as to be movable on the surface of the substrate (referred to as "motion plane" hereinafter).

The movable part 11 is provided with a movable electrode 12 which is applied with a bias voltage VK. In close vicinity of the movable part 11, there are disposed a pair of drive electrodes 13a, 13b generating electrostatic forces with the movable part 11 in the direction along the x-axis, a pair of monitor electrodes 15a, 15b forming capacitors $C_{M1}$, $C_{M2}$ with the movable part 11 exhibiting capacitances which vary complementarily with each other depending on the deviation of the movable part 11 along the x-axis (the capacitors $C_{M1}$, $C_{M2}$ being referred to as "variable monitoring capacitors" hereinafter), and a pair of sense electrodes 17a, 17b forming capacitors $C_{S1}$, $C_{S2}$ with the movable part 11 exhibiting capacitances which vary complementarily with each other depending on the deviation of the movable part 11 along the y-axis orthogonal to the x-axis, and parallel to the motion plane (the capacitors $C_{S1}$, $C_{S2}$ being referred to as "variable sensing capacitors" hereinafter).

Since the structure of the sensing element used for the electrostatically-driven/capacitance-detection type gyro sensor is well known (refer to Japanese Patent Applications Laid-open No. 2000-81335, and No. 2001-153659, for example), no further explanation for the sensing element 1 is given here.

By properly controlling the voltage difference between the movable electrode 12 and the drive electrodes 13a, 13b, the movable part 11 can continue to vibrate along the x-axis. If the sensing element 1 is imparted with rotative motion around the axis orthogonal to the motion plane when the movable part 11 is vibrating along the x-axis, the movable part 11 develops vibration along the y-axis by the Coriolis force depending on the angular velocity of the rotative motion. The vibration of the movable part 11 along the x-axis causes capacitance variations of the monitor capacitors $C_{M1}$, $C_{M2}$, and the vibration of the movable part 11 along the y-axis causes capacitance variations of the sense capacitors $C_{S1}$, $C_{S2}$.

Figure 2A:
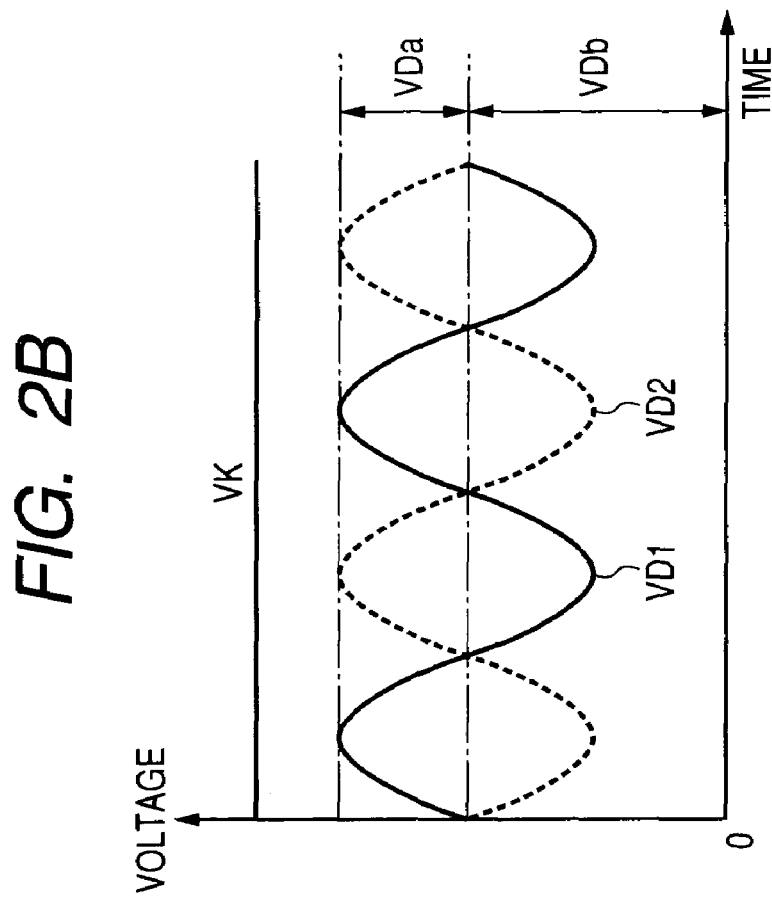
FIG. 2A is a diagram explaining the operation of a sensing element of the gyro sensor.
Figure 2B:
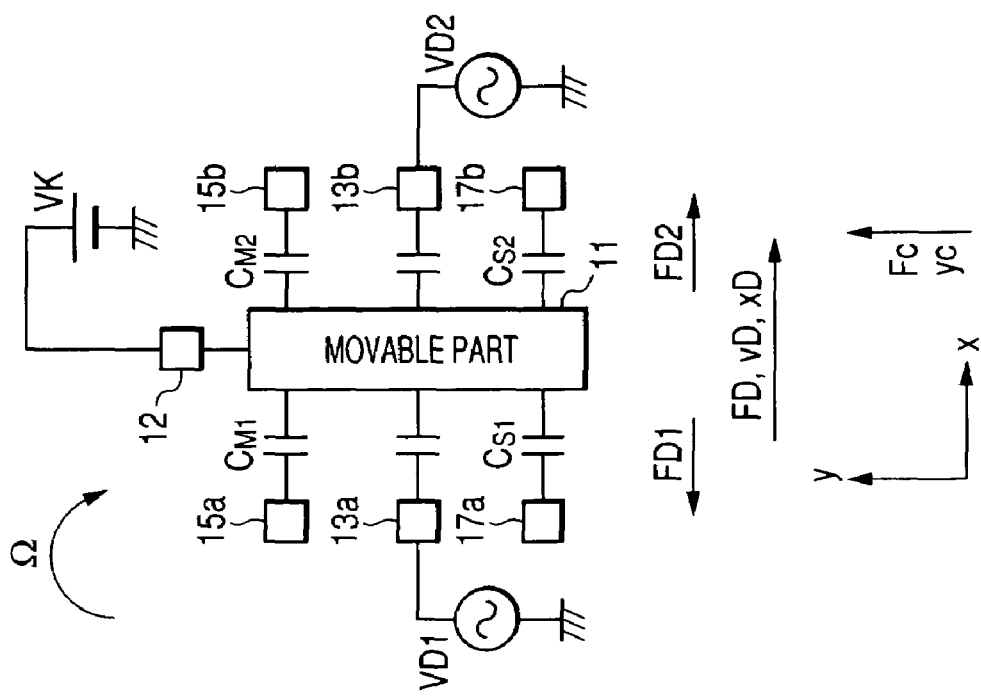
FIG. 2B is a waveform diagram explaining the operation of the sensing element of the gyro sensor according to the first embodiment of the invention.

This is explained in more detail below with reference to FIGS. 2A. Here, it is assumed that the drive electrodes 13a, 13b are applied with a drive signal VD1(t) and a drive signal VD2(t), respectively, these drive signals having the same amplitude VDa and the same offset voltage VDb($\geq$VDa), and the movable electrode 12 is applied with the bias voltage VK of a constant value ($\geq$VDa+VDb), as shown in FIG. 2B.

In this state, the drive signals VD1(t), VD2(t) are given by the equations (1), (2), respectively, and the electrostatic forces FD1(t), FD2(t) arising between the movable part 11 and the drive electrodes 13a, 13b are given by the equations (3), (4), respectively.

$$VD1(t) = VDa \cdot \sin \omega_d t + VDb \quad (1)$$

$$VD2(t) = -VDa \cdot \sin \omega_d t + VDb \quad (2)$$

$$FD1(t) = k_{VD} \cdot [VK - VD1(t)]^2 \quad (3)$$

$$FD2(t) = k_{VD} \cdot [VK - VD2(t)]^2 \quad (4)$$

In these equations, $\omega_d (=2 \cdot \pi \cdot f_d$, $f_d$ being a drive frequency) represents a drive angular velocity.

The drive force FD(t) applied to the movable part 11 is given by the equation (5), where the direction toward the right in this figure represents a positive direction. Substituting the equations (1) to (4) into the equation (5) yields the equations (6), (7).

$$FD(t) = FD2(t) - FD1(t) \quad (5)$$

$$= FDa \cdot \sin \omega_d t \quad (6)$$

$$FDa = 4 \cdot k_{VD} \cdot VDa \cdot (VK - VDb) \quad (7)$$

When the displacement of the movable part 11 along the x-axis due to the drive force FD(t) is xD(t), the displacing velocity vD(t) of the movable part 11 along the x-axis is given by the equation (8), and the amplitude vDa of the displacing velocity vD(t) and the amplitude xDa of the displacement xD(t) satisfy the equation (9a). Since the amplitude xDa of the displacement xD(t) is proportional to the drive force amplitude FDa, the equation (9b) holds.

$$vD(t) = \frac{d}{dt} xD(t) \quad (8)$$

$$vDa = \omega_d \cdot xDa \quad (9a)$$

$$vDa \propto \omega_d \cdot FDa \quad (9b)$$

When the angular velocity imparted to the movable part 11 and the mass of the movable part 11 is $\Omega$ and m, respectively, the Coriolis force Fc is given by the equation (10).

$$Fc = 2 \cdot m \cdot vD(t) \cdot \Omega \quad (10)$$

When the displacement of the movable part 11 along the y-axis due to the Coriolis force Fc is yc, since the displacement yc is proportional to the Coriolis force Fc, and Coriolis force Fc is proportional to the displacing velocity vD(t) of the movable part 11 along the x-axis as apparent from the equation (10), the equation (11a) holds where yca is the amplitude of the displacement yc of the movable part 11 along the y-axis in view of the equation (9a).

$$yca \propto vDa = \omega_d xDa \tag{11a}$$

Since the amplitude vDa of the displacing velocity is proportional to the product of the drive angular velocity $\omega_d$ and the amplitude FDa of the drive force FD(t) as shown in the equation (9b), and the amplitude FDa is proportional to the product of the amplitude VDa of the drive signal and the difference between the bias voltage VK and the offset voltage VDb of the drive signal as shown in the equation (7), the equation (11b) holds.

$$yca \propto \omega_d \cdot VDa \cdot (VK - VDb) \tag{11b}$$

As apparent from the equations (6), (7), in the sensing element 1, the amplitude of the drive force FD(t) applied to the movable part 11 is determined by the amplitude VDa of the drive signal, the offset voltage VDb of the drive signal, and the bias voltage VK. Also, as apparent from the equation (11b), the sensitivity for detecting the angular velocity Ω is determined by the angular frequency $\omega_d$, amplitude VDa and offset voltage VDb of the drive signal, and the bias voltage VK.

The detector unit 2 includes a first reference voltage generator 8 generating a first reference voltage VrefA (rated as 2.5V in this embodiment) independent from the power supply voltage VCC (rated as 5V in this embodiment) supplied from outside, a second reference voltage generator 9 generating a second reference voltage VrefB proportional to the power supply voltage VCC (VCC/2 in this embodiment), a high voltage generator 6 generating the bias voltage VK (=$k_{RK}$·VrefA) applied to the movable electrode 12, a drive buffer 5 generating the drive signals VD1(t), VD2(t) having the offset voltage VDb proportional to the first reference voltage VrefA, and a CV converter 3 generating the monitor signals VM1(t), VM2(t) having the first reference voltage VrefA as its offset voltage and varying in voltage level depending on the variations of the capacitances of the variable monitoring capacitors $C_{M1}$, $C_{M2}$ (that is, the vibrating state of the movable part 11 along the x-axis), and generating the sense signals VS1(t), VS2(t) varying in voltage level depending on the variations of the capacitances of the variable sensing capacitors $C_{S1}$, $C_{S2}$ (that is, the vibrating state of the movable part 11 along the y-axis).

The detector unit 2 further includes a drive signal controller 4 controlling the amplitudes and phases of the drive signals VD1(t), VD2(t) generated by the drive buffer 5 in order that the movable part 11 continues to vibrate along the x-axis under the action of the monitor signals VM1(t), VM2(t) generated by the CV converter 3, and a sensor output signal generator 7 generating, from the sense signals VS1(t), VS2(t) generated by the CV converter 3, the sensor output signal $V_{y\omega}$ having the second reference voltage VrefB as its offset voltage and varying in voltage level depending on the Coriolis force Fc applied to the movable part 11 (or the angular velocity Ω imparted to the sensing element 1).

Next, the structure of the detector unit 2 is explained for each part thereof. In the following explanation, the reference characters or symbols representing circuit elements (resistors or capacitors) are also used as values of their element constants (resistances or capacitances).

The First Reference Voltage Generator

Figure 3A:
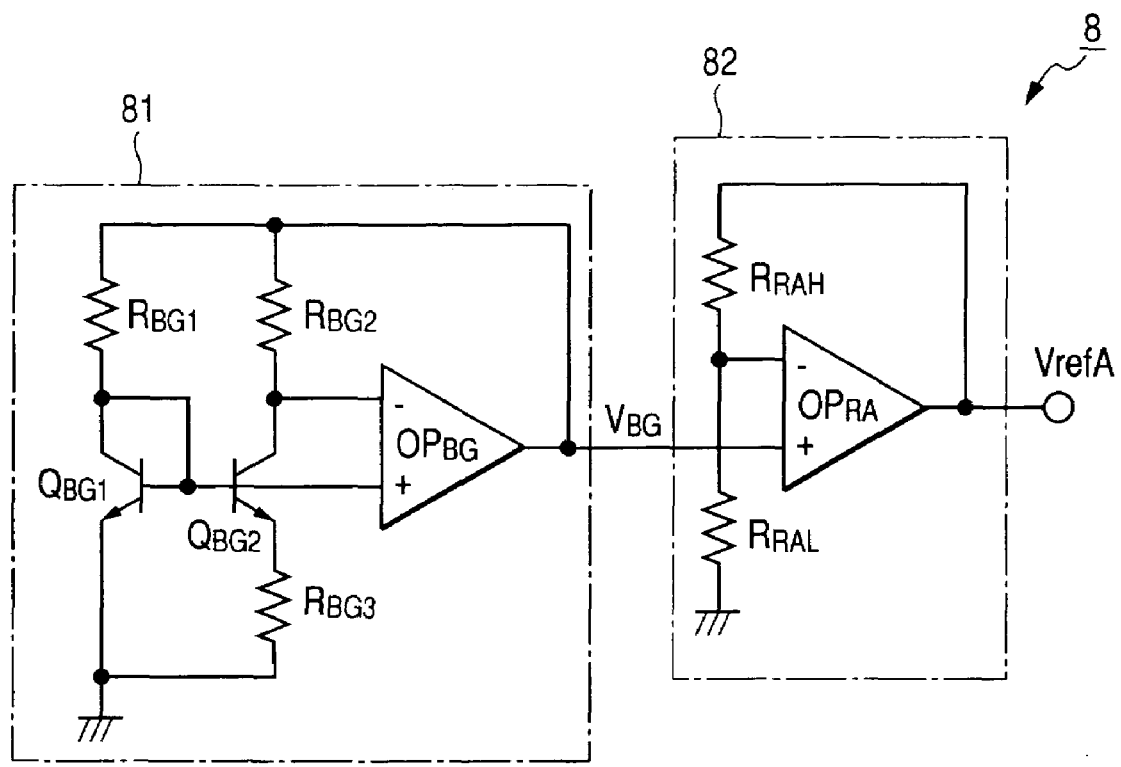
FIG. 3A is a circuit diagram showing a structure of a first reference voltage generator of the gyro sensor according to the first embodiment of the invention.

As shown in FIG. 3A, the first reference voltage generator 8 includes a band-gap reference circuit 81 constituted by an operational amplifier $OP_{BG}$, transistors $Q_{BG1}$, $Q_{BG2}$ and resistors $R_{BG1}$ to $R_{BG3}$, and a non-inverting amplifier circuit 82 constituted by an operational amplifier $OP_{RA}$ and resistors $R_{RAH}$, $R_{RAL}$. The band-gap reference circuit 81 generates a reference voltage $V_{BG}$ (approximately 1.2V) using the band gap voltages of the transistors $Q_{BG1}$, $Q_{BG2}$. The non-inverting amplifier circuit 82 generates the first reference voltage VrefA by amplifying the reference voltage $V_{BG}$.

The bases of the transistors $Q_{BG1}$, $Q_{BG2}$ are connected to the non-inverting input terminal of the operational amplifier $OP_{BG}$. The collector of the transistor $Q_{BG1}$ is connected to the non-inverting input terminal of the operational amplifier $OP_{BG}$, and to the output terminal of the operational amplifier $OP_{BG}$ through the resistor $R_{BG1}$. The emitter of transistor $Q_{BG1}$ is grounded. The collector of the transistor $Q_{BG2}$ is connected to the inverting input terminal of the operational amplifier $OP_{BG}$, and to the output terminal of the operational amplifier $OP_{BG}$ through the resistor $R_{BG2}$. The emitter of transistor $Q_{BG2}$ is grounded through the resistor $R_{BG3}$.

The inverting input terminal of the operational amplifier $OP_{RA}$ of the non-inverting amplifier circuit 82 is connected to the output terminal thereof through the resistor $R_{RAH}$, and grounded through the resistor $R_{RAL}$. The reference voltage $V_{BG}$ generated by the band-gap reference circuit 81 is applied to the non-inverting input terminal of the operational amplifier $OP_{RA}$.

The resistances $R_{BG1}$ to $R_{BG3}$ are set to so such values that the temperature-dependent variation of the reference voltage $V_{BG}$ becomes minimum. The first reference voltage VrefA outputted from the first reference voltage generator 8 is given by the equation (12). In this embodiment, the resistances $R_{RAH}$, $R_{RAL}$ are set set to such values that the first reference voltage VrefA becomes half (2.5V) the power supply voltage VCC (5V).

$$VrefA = \left(\frac{R_{RAH}}{R_{RAL}} + 1\right) \cdot V_{BG} \tag{12}$$

The Second Reference Voltage Generator

Figure 3B:
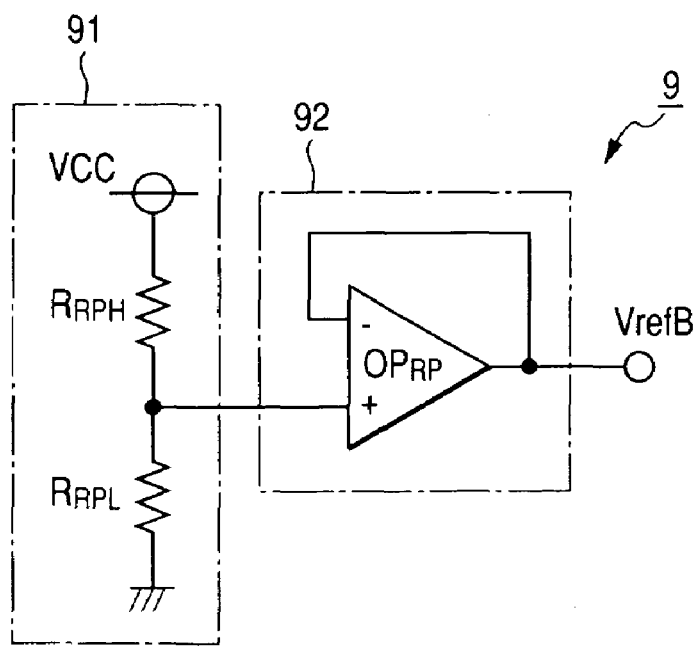
FIG. 3B is a circuit diagram showing a structure of a second reference voltage generator of the gyro sensor according to the first embodiment of the invention.

As shown in FIG. 3B, the second reference voltage generator 9 includes a voltage divider circuit 91 constituted by resistors $R_{RPH}$, $R_{RPL}$ dividing down the power supply voltage VCC supplied from outside, and a buffer circuit 92 constituted by an operational amplifier $OP_{RP}$ having an non-inverting input terminal applied with the divided voltage outputted from the voltage divider circuit 91, and output terminal connected to the inverting input terminal thereof. The buffer circuit 92 outputs the second reference voltage VrefB which is equal to the divided voltage outputted from the voltage divider circuit 91.

The second reference voltage VrefB outputted from the second reference voltage generator 9 is given by the equation (13). In this embodiment, the resistances $R_{RPH}$, $R_{RPL}$ are set at the same value ($R_{RPH}=R_{RPL}$) so that the second reference voltage VrefB is equal to half the power supply voltage VCC.

$$VrefB = \left(\frac{R_{RPL}}{R_{RPH} + R_{RPL}}\right) \cdot VCC \tag{13}$$
$$= \frac{VCC}{2}$$

Thus, the first reference voltage VrefA generated by the first reference voltage generator 8 is constant independently of the power supply voltage. VCC, while the second reference voltage VrefB generated by the second reference voltage generator 9 varies following (in proportion to) the variation of the power supply voltage VCC.

The High Voltage Generator

Figure 4:
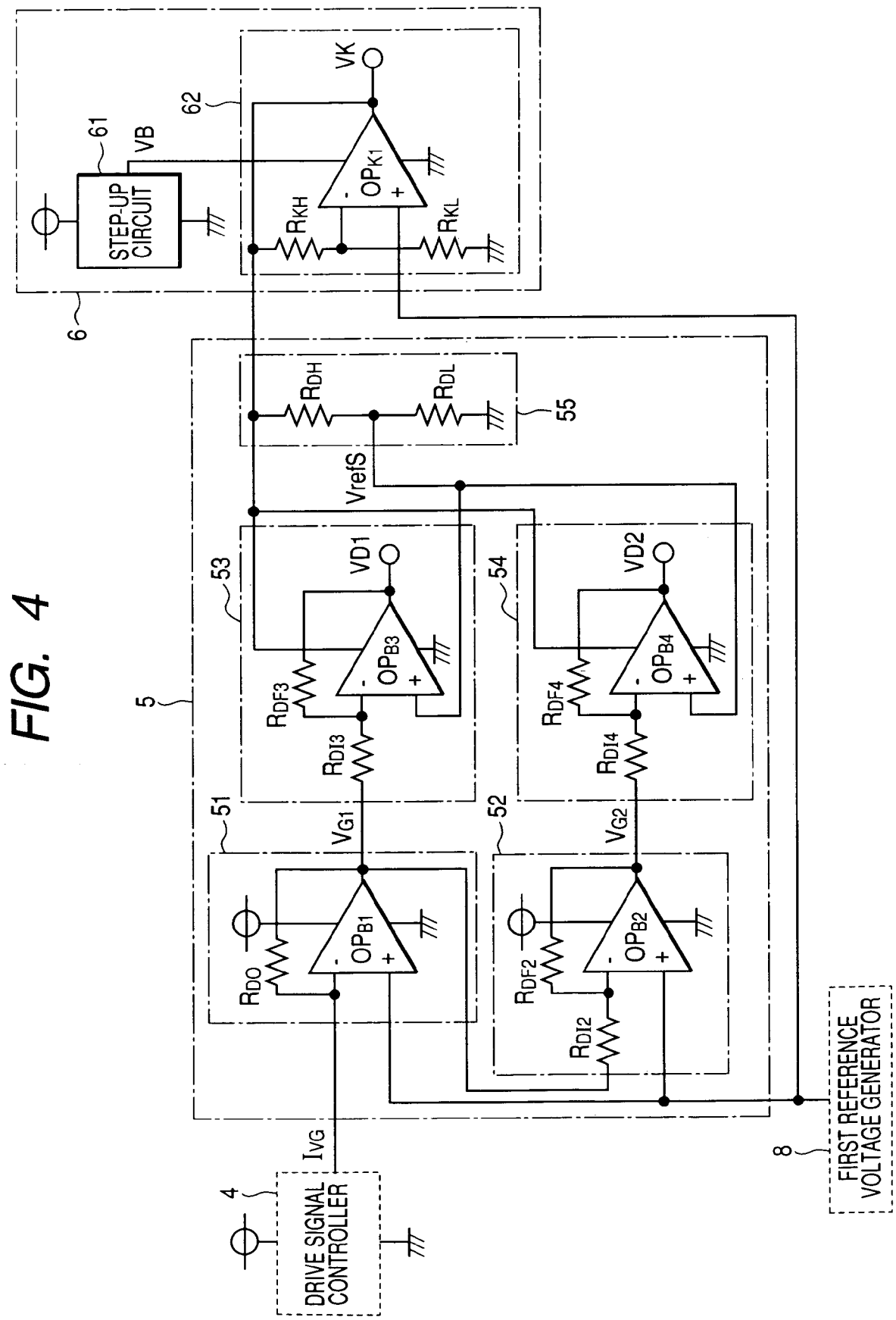
FIG. 4 is a circuit diagram showing structures of a drive buffer and a high voltage generator included in a detector unit of the gyro sensor.

As shown in FIG. 4, the high voltage generator 6 includes a step-up circuit 61 generating a stepped-up voltage VB by stepping up the power supply voltage VCC, and a non-inverting amplifier circuit 62 constituted by an operational amplifier $OP_{K1}$, and resistors $R_{KH}$, $R_{KL}$ and powered by the step-up circuit 61. The non-inverting amplifier circuit 62 amplifies the first reference voltage VrefA to generate the bias voltage VK (>VCC).

The inverting input terminal of the operational amplifier $OP_{K1}$ is connected to the output terminal thereof through the resistor $R_{KH}$, and grounded through the resistor $R_{KL}$. The non-inverting input terminal of the operational amplifier $OP_{K1}$ is applied with the first reference voltage VrefA. The step-up circuit 61 is configured such that the stepped-up voltage VB is higher than the bias voltage VK as long as the power supply voltage VCC is not lower than a predetermined allowable minimum voltage.

The bias voltage VK outputted from the non-inverting amplifier circuit 62 is given by the equation (14) when its gain $k_{RK}$ is given by the equation (15).

$$VK = k_{RK} \cdot VrefA \quad (14)$$

$$k_{RK} = R_{KH}/R_{KL} + 1 \quad (15)$$

The Drive Buffer

As shown in FIG. 4, the drive buffer 5 includes an IV converter circuit 51 converting a control signal $I_{VG}(t)$ outputted as a current signal from the drive signal controller 4 into a voltage signal $V_{G1}(t)$, an inverting amplifier circuit 52 generating a voltage signal $V_{G2}(t)$ by inverting the voltage signal $V_{G1}(t)$, an inverting amplifier circuit 53 generating the drive signal VD1(t) to be applied to the drive electrode 13a by amplifying the voltage signal $V_{G1}(t)$, an inverting amplifier circuit 54 generating the drive signal VD2(t) to be applied to the drive electrode 13b by amplifying the voltage signal $V_{G2}(t)$, and a voltage divider circuit 55 generating a reference voltage VrefS by dividing down the bias voltage VK.

The IV converter circuit 51 is constituted by an operational amplifier $OP_{B1}$, and a resistor $R_{DO}$ connected between the output terminal and inverting input terminal of the operational amplifier $OP_{B1}$. The operational amplifier $OP_{B1}$ is applied with the control signal $I_{VG}(t)$ at the inverting input terminal thereof and applied with the first reference voltage VrefA at the non-inverting input terminal thereof.

The inverting amplifier circuit 52 is constituted by an operational amplifier $OP_{B2}$, a resistor $R_{DF2}$ connected between the output terminal and inverting input terminal thereof, and a resistor $R_{DI2}$ through which the voltage signal $V_{G1}(t)$ is applied to the inverting input terminal of the operational amplifier $OP_{B2}$. The first reference voltage VrefA is applied to the non-inverting input terminal of the operational amplifier $OP_{B2}$. The resistances $R_{DI2}$ and $R_{DF2}$ are set at the same value so that the gain of the inverting amplifier circuit 52 is one.

The voltage signals $V_{G1}(t)$ and $V_{G2}(t)$ are given by the equations (16) and (17), respectively. They varies depending on the first reference voltage VrefA as their offset voltage.

$$V_{G1}(t) = -I_{VG}(t) \cdot R_{DO} + VrefA \quad (16)$$

$$V_{G2}(t) = -\{V_{G1}(t) - VrefA\} + VrefA \quad (17)$$
$$= I_{VG}(t) \cdot R_{DO} + VrefA$$

The inverting amplifier circuit 53 is constituted by an operational amplifier $OP_{B3}$, a resistor $R_{DF3}$ connected between the output terminal and inverting input terminal of the operational amplifier $OP_{B3}$, and a resistor $R_{DI3}$ through which the voltage signal $V_{G1}(t)$ is applied to the inverting input terminal of the operational amplifier $OP_{B3}$. The non-inverting input terminal of the operational amplifier $OP_{B3}$ is applied with the reference voltage VrefS. The inverting amplifier circuit 54 is constituted by an operational amplifier $OP_{B4}$, a resistor $R_{DF4}$ connected between the output terminal and inverting input terminal of the operational amplifier $OP_{B4}$, and a resistor $R_{DI4}$ through which the voltage signal $V_{G2}(t)$ is applied to the inverting input terminal of the operational amplifier $OP_{B4}$. The non-inverting input terminal of the operational amplifier $OP_{B4}$ is applied with the reference voltage VrefS.

Since the gains of the inverting amplifier circuits 53 and 54 are both set at $\alpha D$ $(=R_{DF3}/R_{DI3}=R_{DF4}/R_{DI4})$, the drive signals VD1(t) and VD2(t) are given by the equations (18) and (19), respectively. The reference voltage VrefS is given by the equation (20), and the voltage dividing ratio $k_{RD}$ of the voltage divider circuit 55 is given by the equation (21).

$$VD1(t) = -\alpha D \cdot \{V_{G1}(t) - VrefS\} + VrefS \quad (18)$$

$$VD2(t) = -\alpha D \cdot \{V_{G2}(t) - VrefS\} + VrefS \quad (19)$$

$$VrefS = k_{RD} \cdot VK \quad (20)$$

$$k_{RD} = R_{DL}/(R_{DH} + R_{DL}) \quad (21)$$

Since the offset voltage VDb of the drive signals VD1(t), VD2(t) is the value which they take when $I_{VG}(t)=0$, that is, when $V_{G1}(t)=V_{G2}(t)=VrefA$, the following equation (22) is obtained from the equation (18) or (19).

$$VDb = \{-\alpha D + (\alpha D + 1) \cdot k_{RK} \cdot k_{RD}\} \cdot VrefA \quad (22)$$

As seen from the equations (14), (22), the bias voltage VK generated by the high voltage generator 6 and the offset voltage VDb of the drive signals VD1(t), VD2(t) generated by the drive buffer 5 are constant irrespective of the variation of the power supply voltage VCC.

The CV Converter

The CV converter 3 includes CV converting amplifiers 31 to 34 each of which is connected to corresponding one of the monitor electrodes 15a, 15b and the sense electrodes 17a, 17b.

Figure 5:
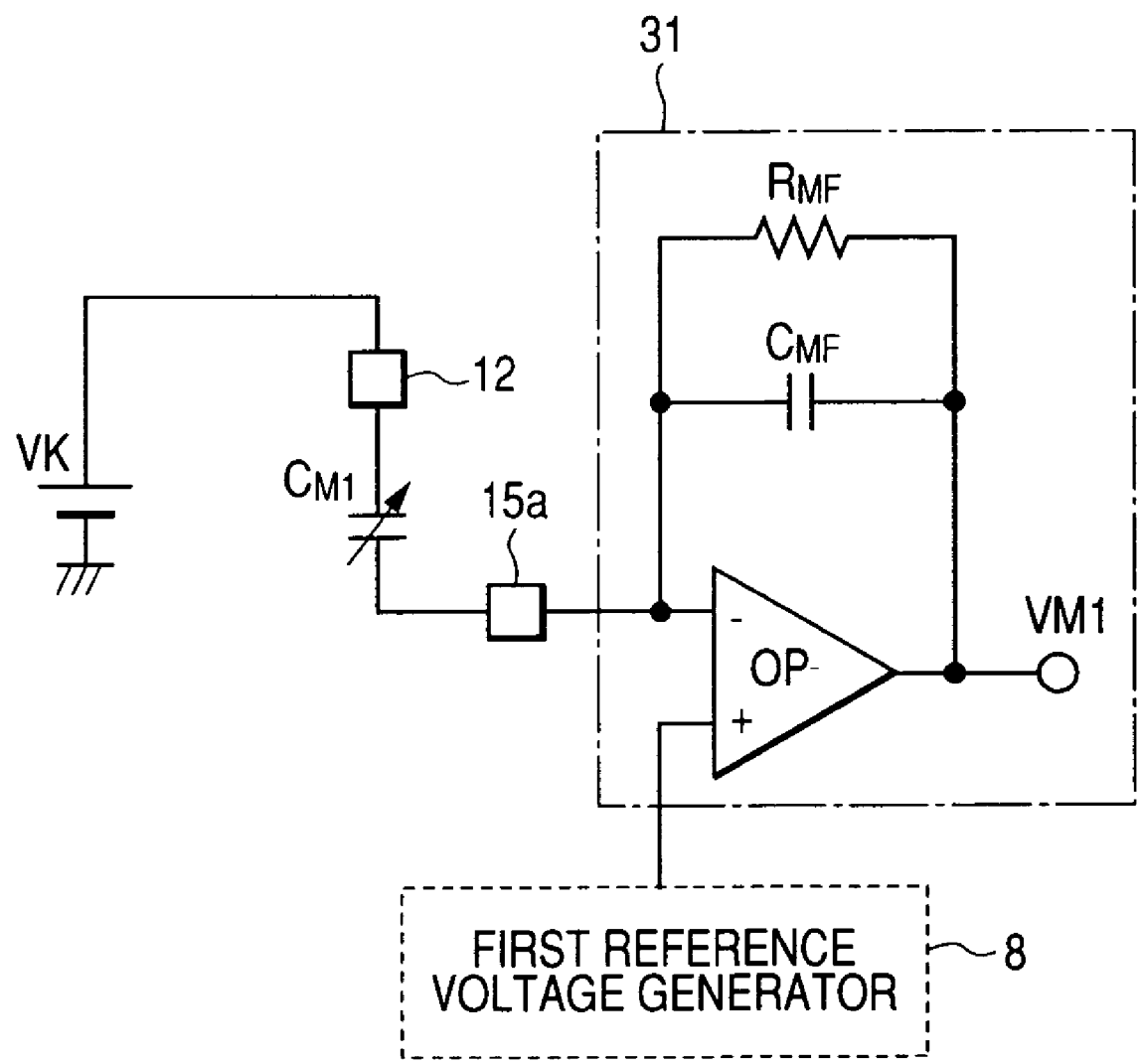
FIG. 5 is a circuit diagram showing a structure of a CV converting amplifier of a CV converter included in the detector unit of the gyro sensor according to the first embodiment of the invention.

Since the CV converting amplifiers 31 to 34 have the same structure, only the CV converting amplifiers 31 is explained here. As shown in FIG. 5, the CV converting amplifier 31 is constituted by an operational amplifier OP having a resistor $R_{MF}$ and a capacitor $C_{MF}$ connected in parallel between the output terminal and inverting input terminal thereof. The CV converting amplifier 31 is applied with the first reference voltage VrefA at the non-inverting input terminal thereof, and is connected to the monitor electrode 15a at the inverting input terminal thereof.

The resistance $R_{MF}$ and the capacitance $C_{MF}$ are set at such values as to satisfy the equation (23).

$$R_{MF} \gg 1/(2 \cdot \pi \cdot f_d \cdot C_{MF}) \quad (23)$$

Accordingly, the current flowing through the resistor $R_{MF}$ is ignored in the following explanation. When the capacitance, amount of the accumulated charge, and voltage across the terminals of the variable monitoring capacitor $C_{M1}$ is $C_{M1}(t)$, $Q_{M1}(t)$, and $V_{CM}$, respectively, when the voltage across the terminals, and the amount of the accumulated charge of the capacitor $C_{MF}$ is $V_{MF}(t)$, and $Q_{MF}(t)$, respectively, and when the monitor signal outputted from the CV converting amplifier 31 is VM1(t), the equations (24) to (27) hold.

$$Q_{M1}(t)=C_{M1}(t)\cdot V_{CM} \tag{24}$$

$$Q_{MF}(t)=C_{MF}\cdot V_{MF}(t) \tag{25}$$

$$V_{CM}=_{VK-V}\text{ref}A \tag{26}$$

$$V_{MF}(t)=V\text{ref}A-VM1(t) \tag{27}$$

Since the current flowing through the capacitor $C_{M1}$ is the same as the current flowing through the capacitor $C_{MF}$, that is, since the derivative of the equation (24) is equal to that of the equation (25), the equation (28) is obtained from the equation (24) to (27).

$$\frac{d}{dt}VM1(t)=-\frac{d}{dt}C_{m1}(t)\cdot\frac{VK-VrefA}{C_{MF}} \tag{28}$$

The displacement xD(t) of the movable part 11 along the x-axis lags in phase behind the drive force FD(t) by 90 degrees. When the static capacitance and the amplitude of the capacitance variation of the variable monitoring capacitor $C_{M1}$ is CMb and CMa, respectively, the capacitance $C_{M1}(t)$ of the monitoring variable capacitor $C_{M1}$ is given by the equation (29), if the displacement xD(t) of the movable part 11 is antiphase to the capacitance $C_{M1}(t)$ of the variable monitoring capacitor $C_{M1}$. As seen from the equation (30), the amplitude CMa is proportional to the amplitude xDa of the displacement xD(t). In the equation (30), αM is a proportionality factor determined depending on the structure of the movable part 11, etc.

$$C_{M1}(t)=CMa\cdot\cos\omega_d t+CMb \tag{29}$$

$$CMa=\alpha M\cdot xDa \tag{30}$$

Integrating the equation (28) after substituting the equation (29) into the equation (28) yields the equation (31), where $k_{CM}$ is a conversion gain given by the equation (32).

$$VM1(t)=-k_{CM}\cdot CMa\cdot\cos\omega_d t+VrefA \tag{31}$$

$$k_{CM}=(VK-VrefA)/C_{MF} \tag{32}$$

In the same way, the monitor signal VM2(t) outputted from the CV converting amplifier 32 connected to the monitor electrode 15b can be obtained. However, since the capacitance $C_{M2}(t)$ is antiphase to the capacitance $C_{M1}(t)$, the capacitance $C_{M2}(t)$ and the monitor signal VM2(t) are represented by the equation (33) and equation (34), respectively.

$$C_{M2}(t)=-CMa\cdot\cos\omega_d t+CMb \tag{33}$$

$$VM2(t)=k_{CM}\cdot CMa\cdot\cos\omega_d t+VrefA \tag{34}$$

Likewise, the capacitances $C_{S1}(t)$ and $C_{S2}(t)$ of the variable sensing capacitors $C_{S1}$ and $C_{S2}$ are represented by the equation (36) and (37), respectively, and also the sense signals VS1(t) and VS2(t) are represented by the equations (39) and (40), respectively, if the resistance of the resistor $R_{SF}$ and the capacitance of the capacitor $C_{SF}$ connected in parallel between the output terminal and the inverting input terminal of the operational amplifier OP satisfy the relationship shown in the equation (35). In the equations below, CSb is the static capacitance of the variable sensing capacitors $C_{S1}$ and $C_{S2}$, CSa is the amplitude of the capacitance variation of the capacitors $C_{S1}$ and $C_{S2}$ due to the displacement of the movable part 11 along the y-axis, and θ is a relative phase with respect to the drive force FD(t), that takes the value of zero degrees or 180 degrees depending on the direction of the angular velocity Ω. As seen from the equation (38) where αS is a proportionality factor determined depending on the structure of the movable part 11 and the driving state of the movable part 11 along the x-axis, the amplitude CSa of the capacitance variation is proportional to the amplitude yca of the displacement yc(t) along the y-axis. $k_{cs}$ in the equations (39), (40) is the converting gain given by the equation (41).

$$R_{SF}>>1/(2\cdot\pi\cdot f_d\cdot C_{SF}) \tag{35}$$

$$C_{S1}(t)=CSa\cdot\sin(\omega_d t+\theta)+CSb \tag{36}$$

$$C_{S2}(t)=-CSa\cdot\sin(\omega_d t+\theta)+CSb \tag{37}$$

$$CSa=\alpha S\cdot yca \tag{38}$$

$$VS1(t)=-k_{CS}\cdot CSa\cdot\sin(\omega_d t+\theta)+VrefA \tag{39}$$

$$VS2(t)=k_{CS}\cdot CSa\cdot\sin(\omega_d t+\theta)+VrefA \tag{40}$$

$$k_{CS}=(VK-VrefA)/C_{SF} \tag{41}$$

As explained above, the CV converting amplifiers 31 to 34 have the converting gain $k_{CM}$ or $k_{CS}$ which is constant irrespective of the variation of the power supply voltage VCC, and are configured to apply the first reference voltage VrefA to the monitor electrodes 15a, 15b and sense electrodes 17a, 17b to generate the monitor signals VM1(t), VM2(t) and sense signals VS1(t), VS2(t) each of which has the offset voltage equal to the first reference voltage VrefA.

The Drive Signal Controller

The drive signal controller 4 includes a differential amplifier 41 amplifying the difference between the monitor signals VM1(t), VM2(t) outputted from the CV converter 3 to generate a composite monitor signal VM(t), a phase shifter 42 shifting the phase of the composite monitor signal VM(t) by 90 degrees, a full-wave rectifier 44 full-wave rectifying the composite monitor signal VM(t), an error amplifier 45 amplifying the output of the full-wave rectifier 44, and a variable gain amplifier 43 converting the output of the phase shifter 42 into a current signal, the converting gain of the variable gain amplifier 43 being variable depending on the output of the error amplifier 45.

Figure 6:
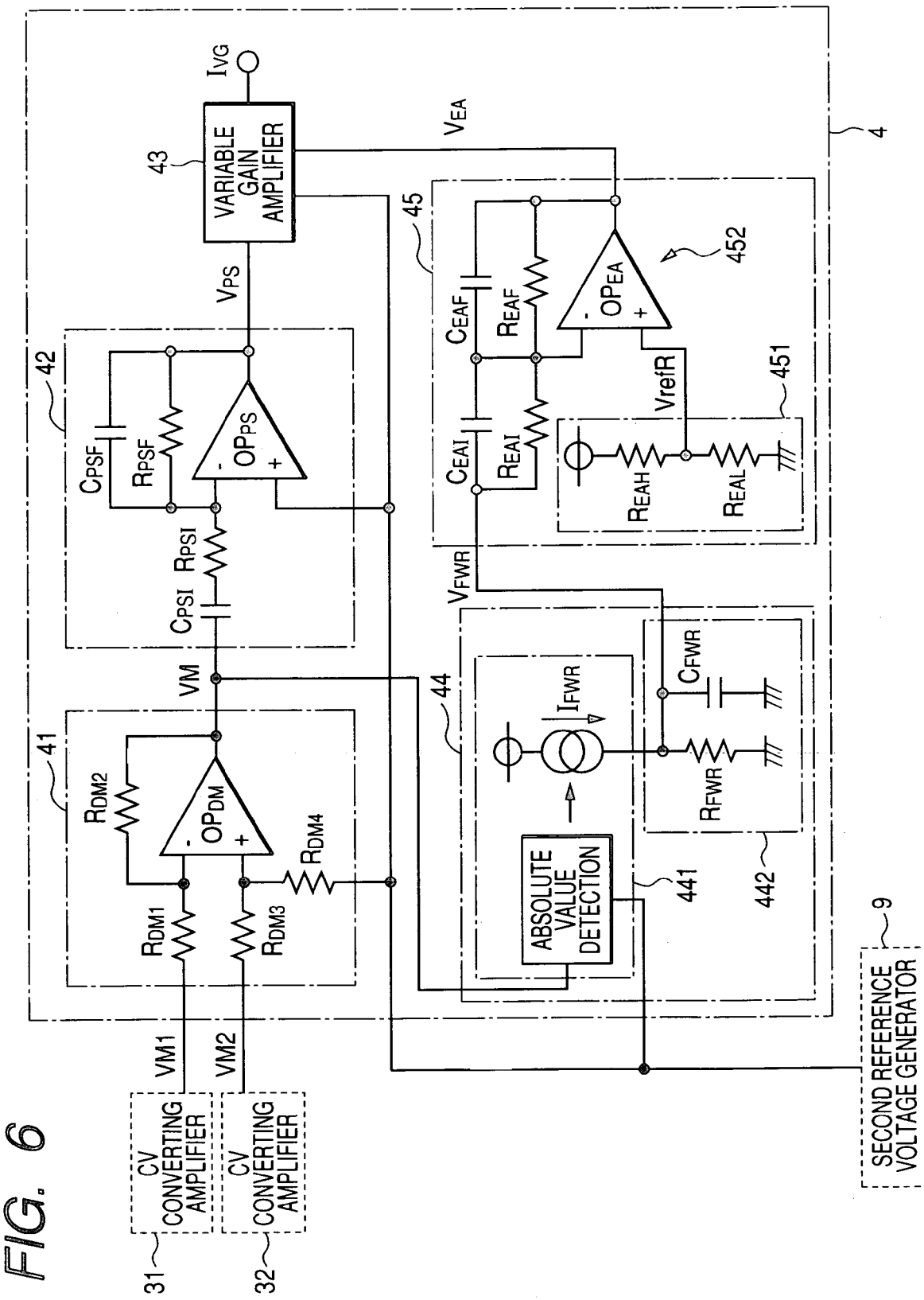
FIG. 6 is a circuit diagram showing a structure of a drive signal controller included in the detector unit of the gyro sensor according to the first embodiment of the invention.

As shown in FIG. 6, the differential amplifier 41 is constituted by an operational amplifier $OP_{DM}$ and resistors $R_{DM1}$ to $R_{DM4}$. The output terminal and the inverting input terminal of the operational amplifier $OP_{DM}$ are connected to each other through the resistor $R_{DM2}$. The operational amplifier $OP_{DM}$ is applied with the monitor signal VM1(t) at its inverting terminal through the resistor $R_{DM1}$, applied with the monitor signal VM2(t) at its non-inverting input terminal through the resistor $R_{DM3}$, and applied with the second reference voltage VrefB at its non-inverting input terminal through the resistor $R_{DM4}$. The resistances $R_{DM1}$ to $R_{DM4}$ are set at such values that the equations (42), (43) hold.

$$R_{DM1}=R_{DM1}=R_{DM3} \tag{42}$$

$$R_{DMF}=R_{DM2}=R_{DM4} \tag{43}$$

The composite monitor signal VM(t) outputted from the differential amplifier 41 is given by the equation (44), where VMa is the amplitude of the composite monitor signal VM(t), which is given by the equation (45).

$$VM(t) = R_{DMF}/R_{DMI} \cdot \{VM2(t) - VM1(t)\} + VrefB \quad (44)$$
$$= VMa \cdot \cos\omega_d t + VrefB$$

$$VMa = R_{DMF}/R_{DMI} \cdot 2CMa/C_{MF} \cdot (VK - VrefA) \quad (45)$$

The phase shifter 42 is constituted by an active filter serving as a band-pass filter constituted by an operational amplifier $OP_{PS}$, resistors $R_{PSI}$, $R_{PSF}$, and capacitors $C_{PSI}$, $C_{PSF}$. The resistor $R_{PSF}$ and the capacitor $C_{PSF}$ are connected in parallel between the output terminal and inverting input terminal of the operational amplifier $OP_{PS}$. The operational amplifier $OP_{PS}$ is applied with the composite monitor signal VM(t) at its inverting input terminal through a series of the capacitor $C_{PSI}$ and the resistor $R_{PSI}$, and applied with the second reference voltage VrefB at its non-inverting input terminal. The resistances of the resistors $R_{PSI}$, $R_{PSF}$, and the capacitances of the capacitors $C_{PSI}$, $C_{PSF}$ are set at such values that the amount of phase shift of the phase shifter 42 is 90 degrees at around the drive frequency fd.

The signal which the phase shifter 42 outputs as a shift signal $V_{PS}(t)$ is given by the equation (46), where $G_{PS}$ is the gain of the phase shifter 42 at the drive frequency fd.

$$V_{PS}(t) = G_{PS} \cdot VMa \cdot \sin\omega_d t + VrefB \quad (46)$$

The full-wave rectifier 44 includes a full-wave rectifying circuit 441 operating using the second reference voltage VrefB as a zero point, and a smoothing circuit 442 constituted by a resistor $R_{FWR}$ and a capacitor $C_{FWR}$ and operating to generate a detection signal $V_{FWR}$ having a voltage level proportional to the amplitude VMa of the composite monitor signal VM(t) by smoothing the output current of the full-wave rectifying circuit 441.

The output current $I_{FWR}(t)$ of the full-wave rectifying circuit 441 is given by the equation (47), and the detection signal $V_{FWR}$ outputted from the smoothing circuit 442 is given by the equation (48), where $k_{FWR}$ is a constant.

$$I_{FWR}(t) = k_{FWR} \cdot |VM(t) - VrefB| \quad (47)$$

$$V_{FWR} = 2/\pi \cdot k_{FWR} \cdot R_{FWR} VMa \quad (48)$$

The error amplifier 45 includes a voltage divider circuit 451 constituted by resistors $R_{EAH}$, $R_{EAL}$, and operating to generate a target voltage VrefR by dividing down the power supply voltage VCC, and an inverting amplifier circuit 452 constituted by an operational amplifier $OP_{EA}$, resistors $R_{EAI}$, $R_{EAF}$, and capacitors $C_{EAI}$, $C_{EAF}$, and operating to amplify the difference between the detection signal $V_{FWR}$ outputted from the full-wave rectifier 44 and the target voltage VrefR.

The resistor $R_{EAF}$ and capacitor $C_{EAF}$ are connected in parallel between the output terminal and inverting input terminal of the operational amplifier $OP_{EA}$. The operational amplifier $OP_{EA}$ is applied with the detection signal $V_{FWR}$ at its inverting input terminal through a parallel circuit of the resistor $R_{EAI}$ and the capacitor $C_{EAI}$, and applied with the target voltage VrefR at its non-inverting input terminal.

The signal outputted as an error signal $V_{EA}(t)$ from the error amplifier 45 is given by the equation (49), and the target voltage VrefR is given by the equation (50).

$$V_{EA} = -R_{EAF}/R_{EAI}(V_{FWR} - VrefR) + VrefR \quad (49)$$

$$VrefR = R_{EAL}/(R_{EAL} + R_{EAH}) \cdot VCC \quad (50)$$

The variable gain amplifier 43 is constituted by a voltage-current converter circuit generating, as a control signal $I_{VG}(t)$, a current signal having a magnitude proportional to the difference between the shift signal $V_{PS}(t)$ outputted from the phase shifter 42 and the second reference voltage VrefB.

The control signal $I_{VG}(t)$ generated by the variable gain amplifier 43 is given by the equation (51). As seen from the equation (51), the voltage-current conversion factor $k_{VG}(V_{EA})$ increases with the increase of the error signal $V_{EA}$ outputted from the error amplifier 45.

$$I_{VG}(t) = k_{VG}(V_{EA}) \cdot \{V_{PS}(t) - VrefB\} \quad (51)$$

In the drive signal controller 4 having the above described configuration, if the amplitude xDa of the displacement xD(t) of the movable part 11 along the x-axis increases for some reason, the amplitude CMa of the capacitance variation of the variable monitoring capacitor, and eventually the amplitude VMa of the composite monitor signal VM(t) increase. As a result, the detection signal $V_{FWR}$ generated by full-wave rectifying the composite monitor signal VM(t) increases, as apparent from the equations (30), (45), (48). As a consequence, the error signal $V_{EA}$ reduces causing the conversion factor $k_{VG}(V_{EA})$ of the variable gain amplifier 43 to be lowered, thereby reducing the amplitude of the control signal $I_{VG}(t)$ as apparent from the equations (49), (51). It follows that the amplitude VDa of the drive signals VD1(t), VD2(t) reduces (see the equations (16) to (19)), which causes the amplitude FDa of the drive force FD(t) applied to the movable part 11 and eventually the displacement amplitude xDa of the movable part 11 to be reduced.

On the other hand, if the displacement amplitude xDa of the movable part 11 reduces for some reason, the amplitude of the control signal $I_{VG}(t)$ generated by the drive signal controller 4 increases, and eventually the displacement amplitude xDa of the movable part 11 increases, because the amplitude VDa of the drive signals VD1(t), VD2(t) increases.

As explained above, the drive signal controller 4 controls the amplitude of the drive signals VD1(t), VD2(t) in order that the amplitude xDa of the displacement of the movable part 11 along the x-axis is kept constant (referred to as "amplitude stabilizing control" hereinafter).

When the displacement amplitude XDa of the movable part 11 is kept constant, the equation (52) holds.

$$V_{FWR} \approx VrefR \quad (52)$$

Substituting the equations (30), (45), (48), (50) into the equation (52) yields the equation (53).

$$xDa = \frac{\pi}{2 \cdot k_{FWR} \cdot R_{FWR}} \cdot \frac{C_{MF}}{2 \cdot \alpha M \cdot (VK - VrefA)} \cdot \frac{R_{DMI}}{R_{DMF}} \cdot \frac{R_{EAL}}{R_{EAH} + R_{EAL}} \cdot VCC \quad (53)$$

As seen from the equation (53), since the conversion factor $k_{VG}$ of the variable gain amplifier 43 is controlled such that the detection signal $V_{FWR}$ representing the amplitude of the composite monitor signal VM(t) becomes equal to the target voltage VrefR which is proportional to the power supply voltage VCC, the target value of the amplitude in the amplitude stabilizing control is a constant proportional to the power supply voltage VCC.

Also, it is apparent from the equations (53), (10), that the value of the element sensitivity becomes a constant proportional to the power supply voltage VCC.

The Sensor Output Signal Generator

As shown FIG. 1, the sensor output signal generator 7 includes a differential amplifier 71 amplifying the difference between the sense signals VS1(t) and VS2(t) outputted from the CV converter 3 to generate a composite sense signal VS(t), a synchronous detector circuit 72 performing synchronous detection on the composite sense signal VS(t) using the shift signal $V_{PS}(t)$ outputted from the phase shifter 42, a low-pass filter 73 smoothing a detector signal $V_{PSD}$ outputted from the synchronous detector circuit 72, and an adjustment/amplification circuit 74 adjusting and amplifying the output of the low-pass filter 73 to generate the sensor output signal $V_{YAW}$.

Figure 7:
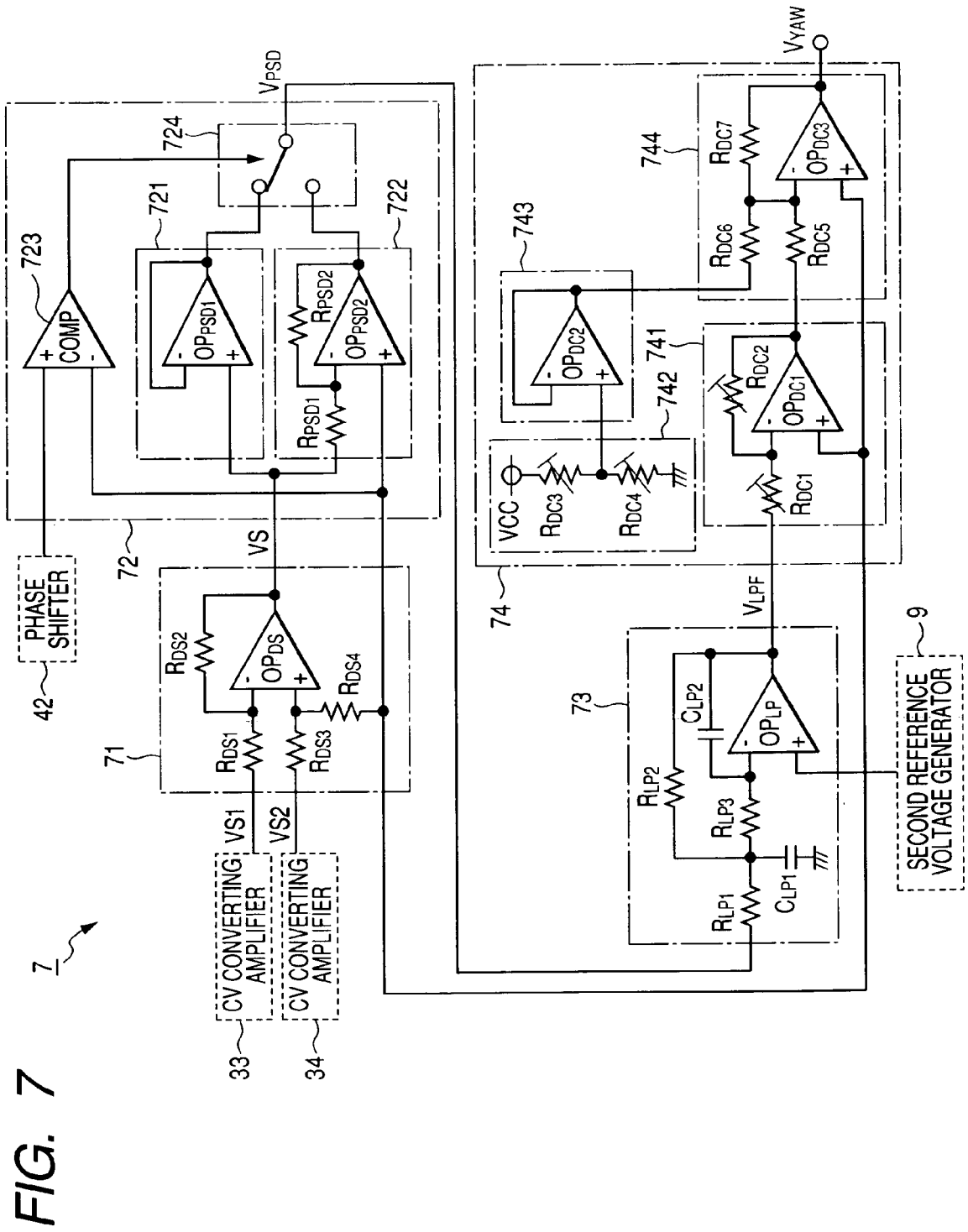
FIG. 7 is a circuit diagram showing a structure of a sensor output signal generator included in the detector unit of the gyro sensor.

As shown in FIG. 7, the differential amplifier 71 is constituted by an operational amplifier OPDs and resistors $R_{DS1}$ to $R_{DS4}$. The output terminal and the inverting input terminal of the operational amplifier $OP_{DS}$ are connected to each other through the resistor $R_{DS2}$. The operational amplifier $OP_{DS}$ is applied with the sense signal VS1(t) at its inverting input terminal through the resistor $R_{DS1}$, applied with the sense signal VS2(t) at its non-inverting input terminal through the resistor $R_{DS3}$, and applied with the second reference voltage VrefB at its non-inverting input terminal through the resistor $R_{DS4}$. The resistances of the resistors $R_{DS1}$ to $R_{DS4}$ are set at such values that the equations (54), (55) hold.

$$R_{DSI}=R_{DS1}=R_{DS3} \quad (54)$$

$$R_{DSF}=R_{DS2}=R_{DS4} \quad (55)$$

The signal which the differential amplifier 71 outputs as the composite sense signal VS(t) is given by the equation (56), where VSa is the amplitude of the composite sense signal VS(t) given by the equation (57), and $k_{DS}(=R_{DSF}/R_{DSI})$ is the gain of the differential amplifier 71.

$$VS(t) = k_{DS} \cdot \{VS2(t) - VS1(t)\} + VrefB \quad (56)$$
$$= VSa \cdot \sin(\omega_d t + \theta) + VrefB$$

$$VSa = k_{DS} \cdot 2CSa/C_{SF} \cdot (VK - VrefA) \quad (57)$$

The synchronous detector circuit 72 includes a buffer circuit 721 constituted by an operational amplifier $OP_{PSD1}$ whose output terminal and non-inverting input terminal are connected to each other to directly output the composite sense signal VS(t) applied to the non-inverting input terminal thereof, an inverting amplifier circuit 722 which is constituted by an operational amplifier $OP_{PSD2}$ having a resistor $R_{PSD2}$ connected between the output terminal and inverting input terminal thereof, and applied with the second reference voltage VrefB at the non-inverting input terminal thereof to output the inverted version of the composite sense signal VS(t) applied to the inverting input terminal thereof through a resistor $R_{PSD1}$, a comparator 723 binarizing the shift signal $V_{PS}(t)$ applied to the non-inverting input terminal thereof using the second reference voltage VrefB applied to the inverting input terminal thereof as a threshold voltage, and a switch 724 outputting one of the output of the buffer circuit 721 and the output of the inverting amplifier circuit 722 selected in accordance with the output of the comparator 723.

As explained above, the synchronous detector circuit 72 is configured to extract, from the composite sense signal VS(t), a component which is in synchronous with the shift signal $V_{PS}(t)$ The output $V_{PSD}(t)$ of the synchronous detector circuit 72 is given by the equation (58). Since such a synchronous detector circuit per se is well known (refer to Japanese Patent Application laid-open No. 2003-65768, for example), no further explanation for the synchronous detector circuit 72 is given here.

$$V_{PSD}(t) = \begin{cases} VS(t) & (V_{PS}(t) > VrefB) \\ -VS(t) & (V_{PS}(t) < VrefB) \end{cases} \quad (58)$$

The low-pass filter 73, which is a second-order active filter of the inverting amplification type, includes an operational amplifier $OP_{LP}$, resistors $R_{LP1}$ to $R_{LP3}$, and capacitors $C_{LP1}$, $C_{LP2}$. The capacitor $C_{LP2}$ is connected between the output terminal and inverting input terminal of the operational amplifier $OP_{LP}$. The resistor $R_{LP3}$ is connected to the inverting input terminal of the operational amplifier $OP_{LP}$ at one end thereof, and the resistor $R_{LP2}$ is connected between the other end of the resistor $R_{LP3}$ and the output terminal of the operational amplifier $OP_{LP}$. This other end of the resistor $R_{LP3}$ is grounded on an AC basis through the capacitor $C_{LP1}$ and is applied with the output $V_{PSD}(t)$ of the synchronous detector circuit 72 through the resistor $R_{LP1}$. The non-inverting input terminal of the operational amplifier $OP_{LP}$ is applied with the second reference voltage VrefB.

The averaged output of the low-pass filter 73 is given by the equation (59), where $k_{LP}$ $(=R_{LP2}/R_{LP1})$ is the gain of the low-pass filter 73.

$$V_{LPDC} = -k_{LP} \cdot (2/\pi) \cdot VSa \cdot \cos\theta + VrefB \quad (59)$$

The adjustment/amplification circuit 74 includes an inverting amplifier circuit 741 performing sensitivity adjustment, a combination of a voltage divider circuit 742 and a buffer circuit 743 performing zero point adjustment, and a summing amplifier circuit 744 summing the output of the inverting amplifier circuit 741 and the output of the buffer circuit 743, and amplifying the summation to generate the sensor output signal $V_{YAW}$.

The inverting amplifier circuit 741, which is constituted by an operational amplifier $OP_{DC1}$, and resistors $R_{DC1}$, $R_{DC2}$, enables adjusting the gain $k_{12}$ $(=R_{DC2}/R_{DC1})$ of the inverting amplifier circuit 741 by trimming the resistors $R_{DC1}$, $R_{DC2}$.

The voltage divider circuit 742, which is constituted by resistors $R_{DC3}$, $R_{DC4}$, divides down the power supply voltage VCC. The buffer circuit 743, which is constituted by an operational amplifier $OP_{DC2}$ whose output terminal and inverting input terminal are connected to each other, directly outputs the divided voltage outputted from the voltage divider circuit 742. By trimming the resistors $R_{DC3}$ and $R_{DC4}$ constituting the voltage divider circuit 742, the division ratio $k_{34}$ $(=R_{DC4}/(R_{DC3}+R_{DC4}))$ of the voltage divider circuit 742 and accordingly the output voltage of the buffer circuit 743 can be adjusted.

The summing amplifier circuit 744 is constituted by an operational amplifier $OP_{DC3}$ and resistors $R_{DC5}$ to $R_{D7}$. The resistor $R_{DC7}$ is connected between the output terminal and inverting input terminal of the operational amplifier $OP_{DC3}$. The operational amplifier $OP_{DC3}$ is applied with the output of the inverting amplifier circuit 741 at the inverting input terminal thereof through the resistor $R_{DC5}$, applied with the output of the buffer circuit 743 at the inverting input terminal thereof through the resistor $R_{DC6}$, and applied with the second reference voltage VrefB at the non-inverting input terminal thereof.

When the gain of the summing amplifier circuit 744 in amplifying the output of the inverting amplifier circuit 741 is $k_{57}$ $(=R_{DC7}/R_{DC5})$, and that in amplifying the output of the buffer circuit 743 is $k_{67}$ $(=R_{DC7}/R_{DC6})$, the output signal of the summing amplifier circuit 744, that is, the sensor output signal $V_{YAW}$ is given by the equations (60) to (63).

$$V_{YAW} = k_{57} \cdot k_{12} \cdot (V_{LPDC} - VrefB) - k_{67} \cdot (k_{34} \cdot VCC - VrefB) + VrefB \quad (60)$$
$$= k_{SE} \cdot CSa \cdot (VK - VrefA) + k_{OF1} \cdot VrefB + k_{OF2} \cdot VCC$$

$$k_{SE} = k_{57} \cdot k_{12} \cdot k_{LP} \cdot k_{DS} \cdot (2/\pi) \cdot (2/C_{SF}) \cdot \cos\theta \quad (61)$$

$$k_{OF1} = k_{67} + 1 \quad (62)$$

$$k_{OF2} = -k_{67} \cdot k_{34} \quad (63)$$

As apparent from the above explanation, it is possible to control the sensitivity ($k_{SE} \cdot (VK-VrefA)$) of the sensor output signal $V_{YAW}$ by adjusting the gain $k_{12}$ of the inverting amplifier circuit 741, and to control the zero point ($k_{OF1} \cdot VrefB + k_{OF2} \cdot VCC$) of the sensor output signal $V_{YAW}$ by adjusting the division ratio $k_{34}$ of the voltage divider circuit 742.

The equation (60) shows that the zero point ($k_{OF1} \cdot VrefB + k_{OF2} \cdot VCC$) of the sensor output signal $V_{YAW}$ varies in proportion to the power supply voltage VCC. Also, since the amplitude CSa of the capacitance variation appearing on the right-hand side of the equation (60) is proportional to the amplitude xDa of the displacement of the movable part 11 along the x-axis as apparent from the equations (38), (11a), and this amplitude xDa is proportional to the target voltage VrefR and is eventually proportional to the power supply voltage VCC as apparent from the equations (53), (50), it can be understood that the sensitivity of the sensor output signal $V_{YAW}$ varies in proportion to the power supply voltage VCC.

As explained above, the gyro sensor of this embodiment is so configured that the CV converter 3, the high voltage generator 6 generating the high voltage affecting the element sensitivity of the sensing element 1, and the drive buffer 5 perform signal processing on the basis of the first reference voltage VrefA which is independent of the power supply voltage VCC, while the others (the drive signal controller 4 and the sensor output signal generator 7) perform signal processing on the basis of the second reference voltage VrefB which varies in proportion to the power supply voltage VCC. Here, the drive signal controller 4 performs the amplitude stabilizing control.

More specifically, the drive force applied to the movable part 11 is kept constant independently of the variation of the power supply voltage VCC by generating the bias voltage VK applied to the movable electrode 12, and the offset voltage VDb of the drive signals VD1(t), VD2(t) applied to the drive electrodes 13a, 13b on the basis of the first reference voltage VrefA. In addition, the element sensitivity of the sensing element 1 is kept constant by performing the amplitude stabilizing control. Furthermore, by applying the first reference voltage VrefA to the monitor electrodes 15a, 15b and the sense electrodes 17a, 17b, the capacitance signals outputted from the sensing element 1 can be converted into the monitor signals VM1(t), VM2(t) and the sense signals VS1(t), VS2(t) at the conversion gains which are constant irrespective of the variation of the power supply voltage VCC.

Hence, the gyro sensor of this embodiment can generate the sensor output signal with a high degree of accuracy, because the element sensitivity of the sensing element 1 and eventually the sensitivity of the sense signal VS(t) are kept unchanged by performing the amplitude stabilizing control and by using the reference voltages independent of the variation of the power supply voltage VCC, even there occurs a change in the vibrating state of the movable part 11 for some reason such as temperature change or secular variation.

Furthermore, in the gyro sensor of this embodiment, since not only the zero point (offset voltage) of the sensor output signal $V_{YAW}$ but also the target voltage VrefR used for the amplitude stabilizing control varies in proportion to the power supply voltage VCC, even when the A/D conversion ratio is changed due to the variation of the power supply voltage VCC, it can be compensated for. Because the sensitivity of the sense signal VS(t) and eventually the sensitivity of the sensor output signal $V_{YAW}$ are changed in the same ratio as the change of the power supply voltage VCC.

With this embodiment, it becomes unnecessary to perform sensitivity adjustment and zero point adjustment on the side of the microcomputer receiving the sensor output signal $V_{YAW}$.

Second Embodiment

Next, a gyro sensor according to a second embodiment of the invention is explained.

Figure 8:
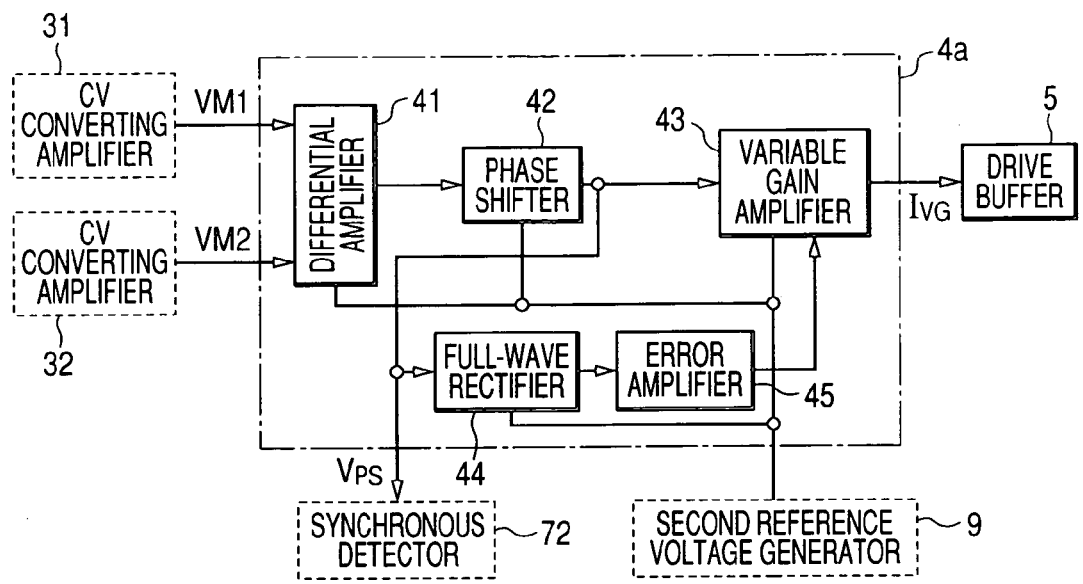
FIG. 8 is a block diagram showing an essential part of a gyro sensor according to a second embodiment of the invention.

Since the second embodiment is different from the first embodiment only in a part of the structure of the drive signal controller, the following explanation focuses on this different part. As shown in FIG. 8, the drive signal controller 4a of the gyro sensor of the second embodiment is configured such that the full-wave rectifier 44 rectifies the shift signal $V_{PS}(t)$ outputted from the phase shifter 42 instead of the composite monitor signal VM(t) outputted from the differential amplifier 41.

When there is temperature change, not only the amplitude xDa of the displacement xD(t) of the movable part 11 but also its angular frequency $\omega_d$ varies depending on the Young's modulus of the base material of the sensing element 1. In this case, since the amplitude vDa of the displacing velocity vD(t) cannot be unchanged even if the amplitude xDa of the displacement xD(t) is kept unchanged as apparent from the equation (10), it is not possible to keep the element sensitivity unchanged.

With the second embodiment where, unlike the first embodiment, not the amplitude xDa of the displacement xD(t) of the movable part 11 but the amplitude vDa ($=\omega_d \cdot xDa$) of the displacing velocity vD(t) is kept constant, it is possible to keep the element sensitivity constant with a higher degree of accuracy than the first embodiment when there is temperature variation. This is explained below in more detail.

In the second embodiment, the transfer function G(s) of the phase shifter 42 is given by the equations (64) to (67).

$$G(s) = -H \cdot \frac{\frac{\omega_0}{Q} \cdot s}{s^2 + \frac{\omega_0}{Q} \cdot s + \omega_0^2} \quad (64)$$

$$H = \frac{C_{PSI} \cdot R_{PSF}}{C_{PSI} \cdot R_{PSI} + C_{PSF} \cdot R_{PSF}} \quad (65)$$

$$Q = \frac{\sqrt{C_{PSI} \cdot C_{PSF} \cdot R_{PSI} \cdot R_{PSF}}}{C_{PSI} \cdot R_{PSI} + C_{PSF} \cdot R_{PSF}} \quad (66)$$

$$\omega_0 = \frac{1}{\sqrt{C_{PSI} \cdot C_{PSF} \cdot R_{PSI} \cdot R_{PSF}}} \quad (67)$$

Substituting s=jω into the equation (64) yields the equation (68)

$$G(j\omega) = -H \cdot \frac{j \cdot \frac{1}{Q} \cdot \left(\frac{\omega}{\omega_0}\right)}{1 - \left(\frac{\omega}{\omega_0}\right)^2 + j \cdot \frac{1}{Q} \cdot \left(\frac{\omega}{\omega_0}\right)} \quad (68)$$

Figure 9:
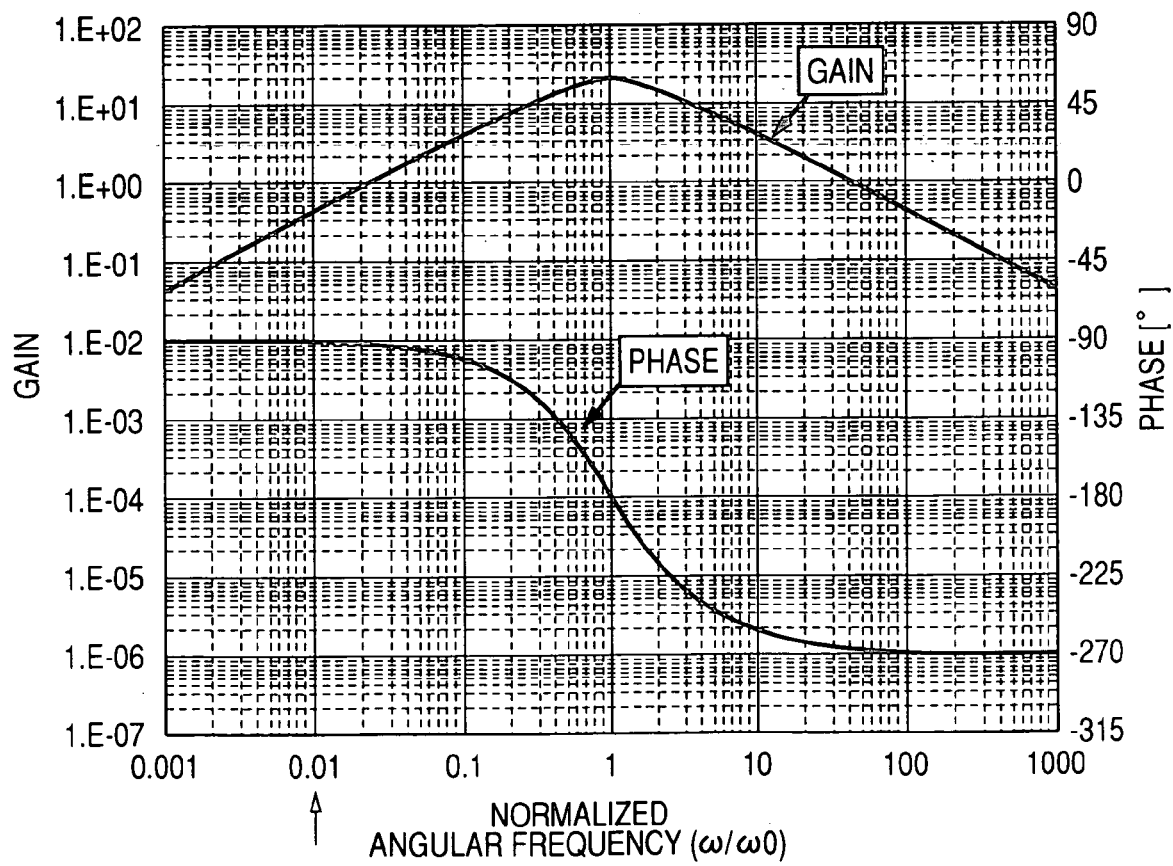
FIG. 9 is a graph showing frequency characteristics of a phase shifter of a drive signal controller of the gyro sensor according to the second embodiment of the invention.

FIG. 9 is a graph showing the frequency characteristic of the phase shifter 42 calculated from the equation (68) when H=20, and Q=0.5. As seen from this graph, if $\omega_d/\omega_0$ is sufficiently smaller than one, for example, when $\omega_d/\omega_0$=0.01, the phase difference between input and output signals in the phase shifter 42 can be regarded as substantially 90 degrees.

If $\omega_d/\omega_0 \ll 1$, the gain of the transfer function G (j$\omega_d$) can be approximated by the equation (69).

$$|G(j\omega)_d| = H \cdot \frac{1}{Q} \cdot \left(\frac{\omega_d}{\omega_0}\right) \quad (69)$$

As apparent from the equation (69), the gain of the phase shifter 42 is proportional to the drive angular frequency $\omega_d$. Also, since the amplitude VMa of the composite monitor signal VM(t) inputted to the phase shifter 42 is proportional to the displacement amplitude xDa of the movable part 11, the amplitude VPSa of the shift signal $V_{PS}(t)$ outputted from the phase shifter 42 is proportional to both the drive angular frequency $\omega_d$ and the displacement amplitude xDa, and eventually it is proportional to the amplitude vDa (=$\omega_d$·xDa) of the displacing velocity vD(t) which is the derivative of the displacement xD(T). Accordingly, by controlling the amplitude VDa of the drive signals VD1(t), VD2(t), it is possible to keep the amplitude vDa of the displacing velocity vD(t) constant, as a result of which, the element sensitivity of the sensing element 1 and accordingly the sensitivity of the sense signal VS(t) can be kept constant more accurately.

Third Embodiment

Next, a gyro sensor according to a third embodiment of the invention is explained.

Figure 10A:
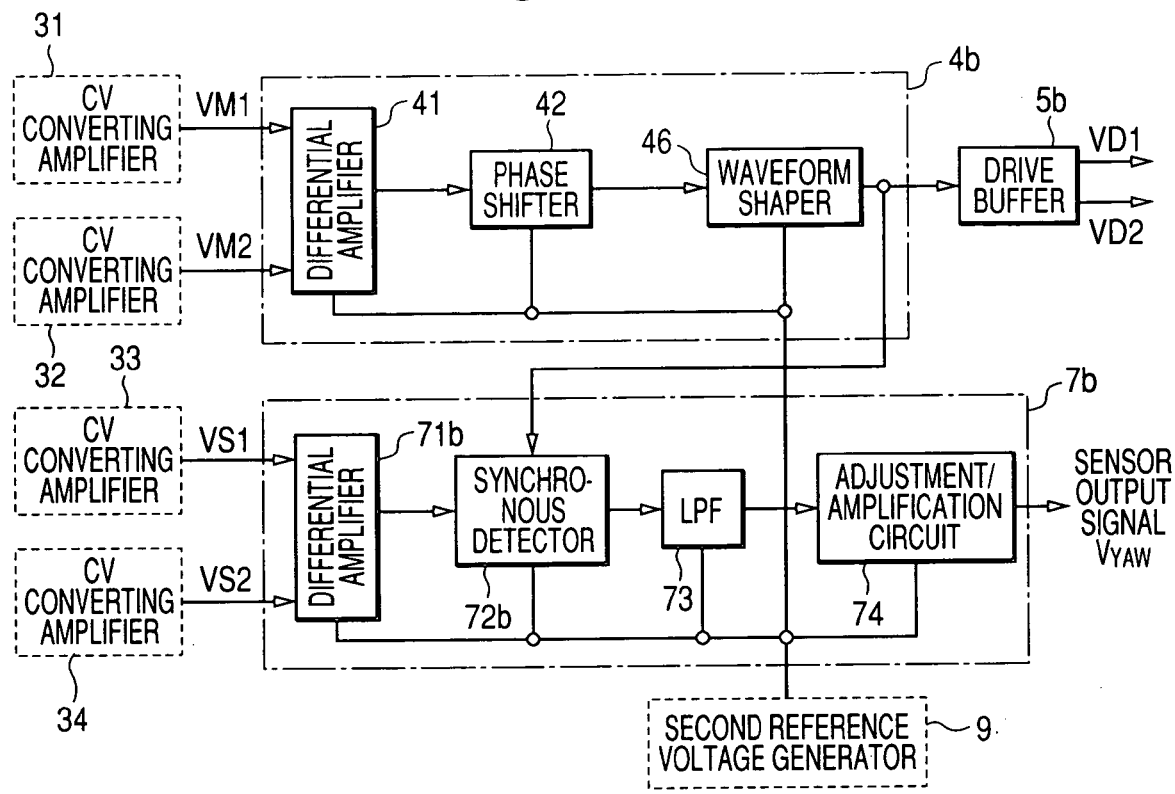
FIG. 10A is a block diagram showing an essential part of a gyro sensor according to a third embodiment of the invention.

The following explanation focuses on the difference in structure between the first embodiment and the third embodiment. As shown in FIG. 10A, in the third embodiment, the drive signal controller 4b is provided with a waveform shaper 46 shaping the shift signal $V_{PS}(t)$ outputted from the phase shifter 42 to have a rectangular waveforms instead of the variable gain amplifier 43, the full-wave rectifier 44 and the error amplifier 45, and also the sensor output signal generator 7b is provided with a differential amplifier 71b and a synchronous detector circuit 72b instead of the differential amplifier 71 and the synchronous detector circuit 72. The output of the waveform shaper 46 is supplied to the drive buffer 5b and synchronous detector circuit 72b.

Figure 10B:
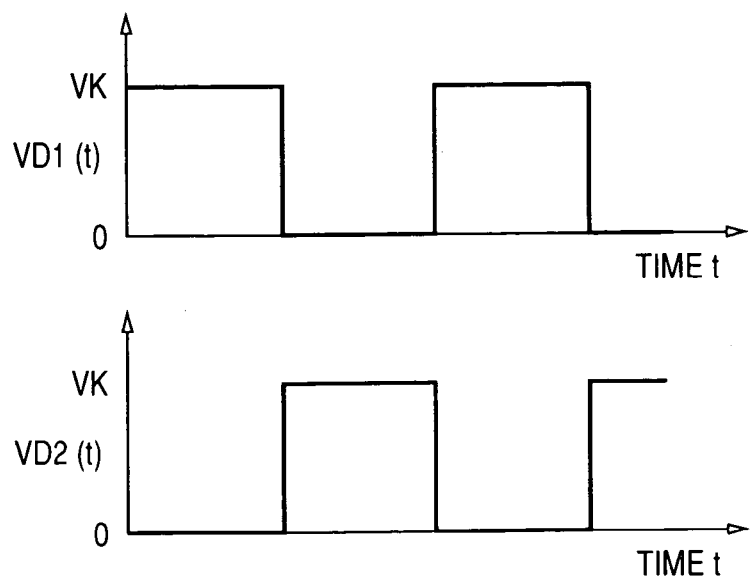
FIG. 10B is a diagram showing waveforms of drive signals generated by a drive buffer of the gyro sensor according to the third embodiment of the invention.

The drive buffer 5b generates two complementary signals as the drive signals VD1(t), VD2(t), each of which exhibits a high voltage level (bias voltage VK) and a low voltage level (ground voltage) in cycles as shown in FIG. 10B in accordance with the output of the waveform shaper 46.

Figure 11:
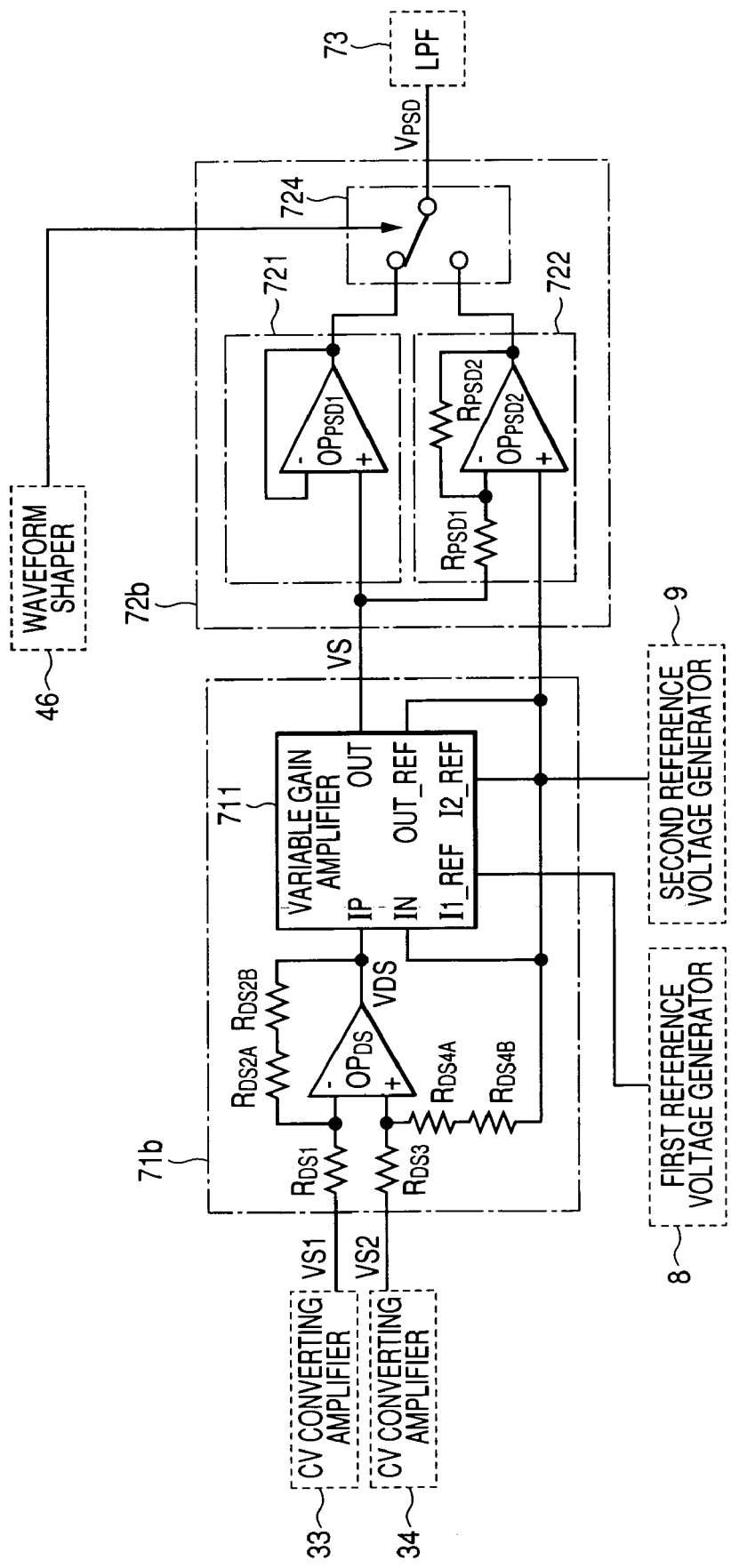
FIG. 11 is a circuit diagram showing a structure of a differential amplifier and a synchronous detector circuit of a sensor output signal generator of the gyro sensor according to the third embodiment of the invention.

As shown in FIG. 11, the synchronous detector circuit 72b of the sensor output signal generator 7b has a configuration where the comparator 723 is removed, and the switch 724 is driven directly by the output of the waveform shaper 46. Also, as shown in FIG. 11, the differential amplifier 71b has a configuration where, instead of the resistor $R_{DS2}$, resistors $R_{DS2A}$ and $R_{DS2B}$ are connected in series between the output terminal and inverting input terminal of the operational amplifier $OP_{DS}$, and, instead of the resistor $R_{DS4}$, resistors $R_{DS4A}$ and $R_{DS4B}$ are connected in series between the non-inverting input terminal of the operational amplifier $OP_{DS}$ and the output of the second reference voltage generator 9. This part constituted by the operational amplifier $OP_{DS}$ is referred to as "differential amplifying part" in the following descriptions. The differential amplifier 71b is provided with a variable gain amplifier 711 changing the amplitude of the output voltage VDS of the operational amplifier $OP_{DS}$ in accordance with the voltage level of the power supply voltage VCC.

The resistors $R_{DS1}$, $R_{DS2A}$, $R_{DS3}$, and $R_{DS4A}$ are thin-film resistors having small temperature coefficients (within ± several tens of ppm/° C.), while the resistors $R_{DS2B}$ and $R_{DS4B}$ are diffused resistors having large temperature coefficients (+several thousands of ppm/° C.).

The gain $k_{DS}$ of the differential amplifying part of the differential amplifier 71b having the above described structure is given by the equation (70), where the resistances of the resistors included in the differential amplifier 71b satisfy the equation (71) to (73).

$$k_{DS} = (R_{DSFA} + R_{DSFB})/R_{DSI} \quad (70)$$

$$R_{DSI} = R_{DS1} = R_{DS3} \quad (71)$$

$$R_{DSFA} = R_{DS2A} = R_{DS4A} \quad (72)$$

$$R_{DSFB} = R_{DS2B} = R_{DS4B} \quad (73)$$

Since the temperature coefficient of the resistor $R_{DSFB}$ is sufficiently larger than those of the resistors $R_{DS1}$ and $R_{DSFA}$, the gain $k_{DS}$ of the differential amplifier 71b has a positive temperature coefficient. In addition, the positive temperature coefficient of the gain $k_{DS}$ can be adjusted by changing the resistance ratios $R_{DS2A}/R_{DS2B}$ and $R_{DS4A}/R_{DS4B}$.

Figure 12:
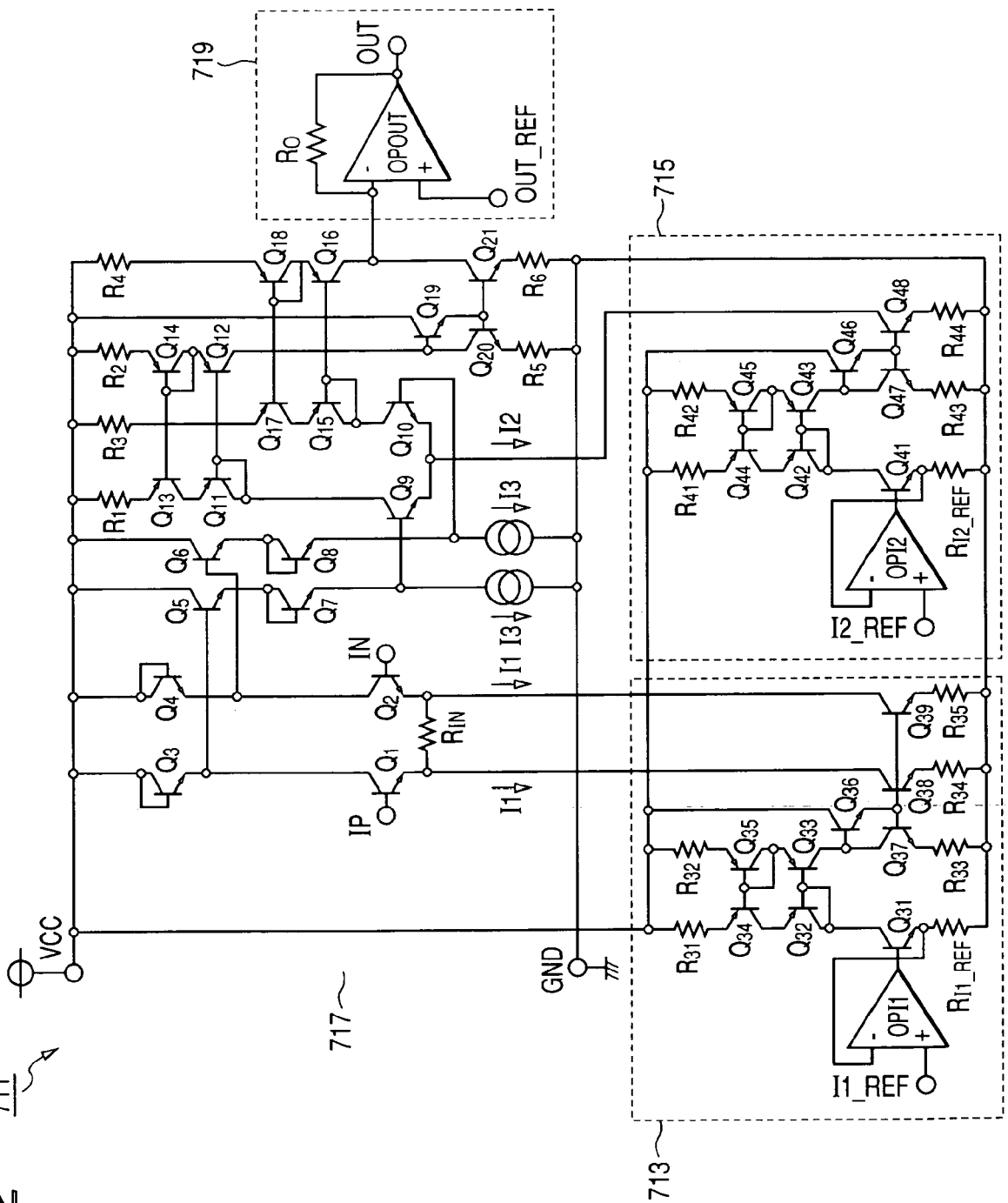
FIG. 12 is a circuit diagram showing a structure of a variable gain amplifier constituting a differential amplifier of a sensor output signal generator of the gyro sensor according to the third embodiment of the invention.

As shown in FIG. 12, the variable gain amplifier 711 includes a first constant current circuit 713 having a terminal I1_REF applied with the first reference voltage VrefA, a resistor $R_{I1\_REF}$ for generating a current having an intensity in accordance with the magnitude of the first reference voltage VrefA, etc., a second constant current circuit 715 having a terminal I2_REF applied with the second reference voltage VrefB, a resistor $R_{I2\_REF}$ for generating a current having an intensity in accordance with the magnitude of the second reference voltage VrefB, etc., a current signal generator circuit 717 having a terminal IP applied with the voltage VDS outputted from the differential amplifying part, a terminal IN applied with the second reference voltage VrefB, a resistor $R_{IN}$ for generating a current signal having a magnitude in accordance with the difference between the voltage VDS and the second reference voltage VrefB (that is, the amplitude of the voltage VDS), etc., and an IV converter circuit 719 having a terminal OUT_REF applied with the second reference voltage VrefB, a resistor RO for converting the current signal generated by the current signal generator circuit 717 into a voltage signal, a terminal OUT for outputting the voltage signal outputted from the resistor RO, etc.

When the voltages applied to the terminals IP, IN, OUT, OUT_REF, I1_REF, and I2_REF are $V_{IP}$, $V_{IN}$, $V_{OUT}$, $V_{OUT\_REF}$, $V_{I1\_REF}$, and $V_{I2\_REF}$, respectively, the equation (74) holds, where $G_{VG}$ is a gain of the variable gain amplifier 711 given by the equation (75).

$$V_{OUT} = G_{VG} \cdot (V_{IP} - V_{IN}) + V_{OUT\_REF} \quad (74)$$
$$= G_{VG} \cdot (VDS - VrefB) + VrefB$$

$$G_{VG} = \frac{R_O}{R_{IN}} \cdot \frac{I1}{I2} = \frac{R_O}{R_{IN}} \cdot \frac{V_{I2\_REF}/R_{I2\_REF}}{V_{I1\_REF}/R_{I1\_REF}} \quad (75)$$
$$= \frac{R_O}{R_{IN}} \cdot \frac{R_{I1\_REF}}{R_{I2\_REF}} \cdot \frac{VrefB}{VrefA}$$

As apparent from the equation (75), the gain $G_{VG}$ of the variable gain amplifier 711 varies in proportion to the second reference voltage VrefB, and therefore in proportion to the power supply voltage VCC. Accordingly, the gyro sensor of this embodiment can keep the sensitivity of the sense signal VDS amplified by the differential amplifying part unchanged without performing the amplitude stabilizing control which is must in the first embodiment, because the temperature characteristic of the sense signal VS(t) (the variation of the sense signal VS(t) due to temperature variation) can be compensated for by the temperature characteristic of the gain of the differential amplifying part determined from the resistances of the resistors included in the differential amplifying part.

In addition, since the gain $G_{VG}$ of the variable gain amplifier 711 receiving the voltage VDS outputted from the differential amplifying part varies in proportion to the power supply voltage VCC, even when the A/D conversion ratio changes due to change of the power supply voltage VCC, it is possible to change the sensitivity of the output VS of the differential amplifier 71b and therefore the sensitivity of the sensor output signal $V_{YAW}$ by the same ratio as the change of the A/D conversion ratio.

In short, the gyro sensor of the third embodiment which is simpler in structure than the first embodiment can provide the same advantages as the first embodiment.

Figure 13:
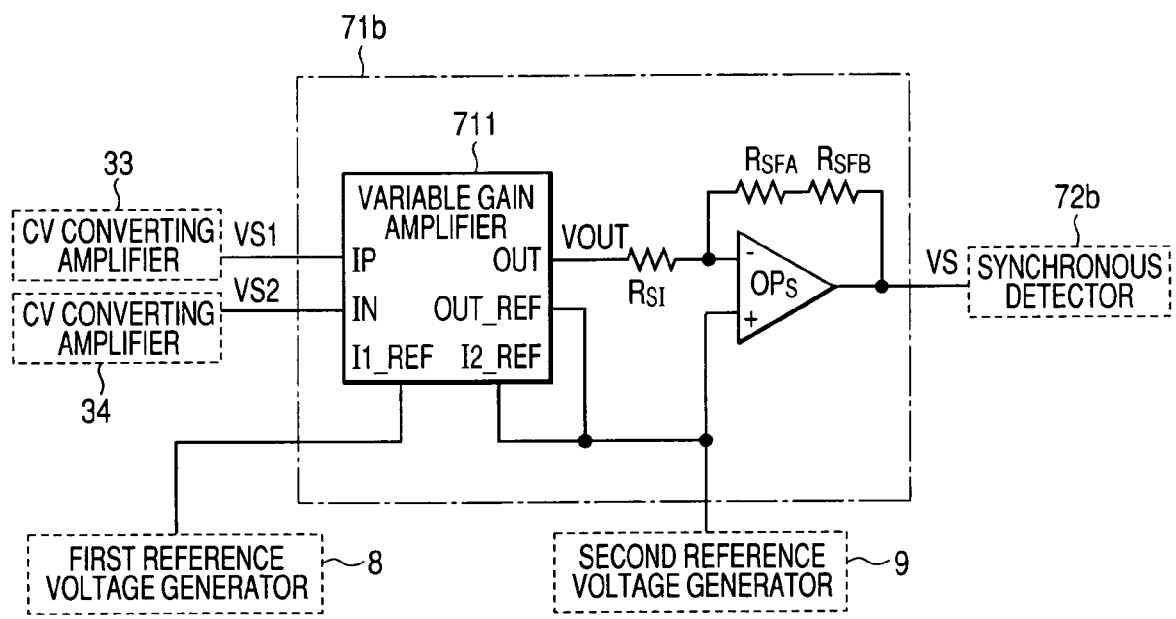
FIG. 13 is a circuit diagram showing another structure of the differential amplifier of the sensor output signal generator of the gyro sensor according to the third embodiment of the invention.

As understood from FIG. 12 showing a circuit structure of the variable gain amplifier 711, and the equation (74), the variable gain amplifier 711 can be used as a differential amplifier. FIG. 13 shows an example of the differential amplifier 71b when the variable gain amplifier 711 is used as a differential amplifier. In this example, the differential amplifier 71b has a structure where the differential amplifying part constituted by the operational amplifier $OP_{DS}$ is removed, the sense signals VS1(t), VS2(t) outputted from the CV converting amplifiers 33, 34 are supplied to the input terminals IP, IN of the variable gain amplifier 711, respectively, and the output from the terminal OUT of the variable gain amplifier 711 is amplified by an amplifier circuit having a gain whose temperature characteristic is adjustable.

Such an amplifier may be constituted by an operational amplifier $OP_S$ whose inverting input terminal is applied with the voltage outputted from the terminal OUT of the variable gain amplifier 711 through a resistor $R_{Si}$, whose non-inverting input terminal is applied with the second reference voltage VrefB, and whose output terminal is connected to the inverting input terminal thereof through resistors $R_{SFA}$, $R_{SFB}$ connected in series. Thin-film resistors having small temperature coefficients are used as the resistors $R_{Si}$, $R_{SFA}$, and a diffused resistor having large temperature coefficient is used as the resistor $R_{SFB}$.

Figure 14A:
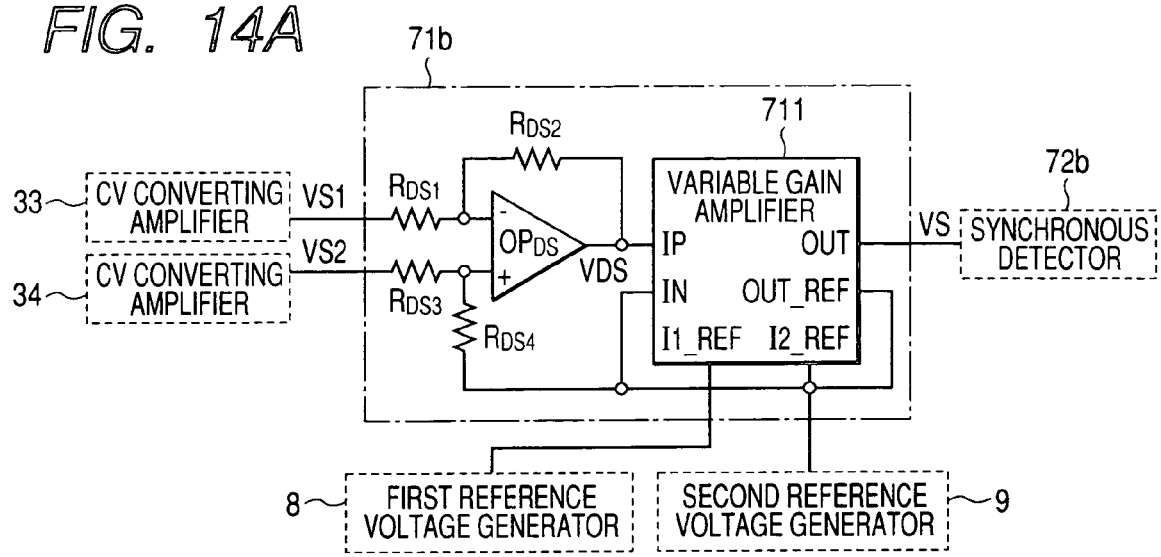
FIGS. 14A to 14C are circuit diagrams showing different structures of the differential amplifier of the sensor output signal generator of the gyro sensor according to the third embodiment of the invention.
Figure 14B:
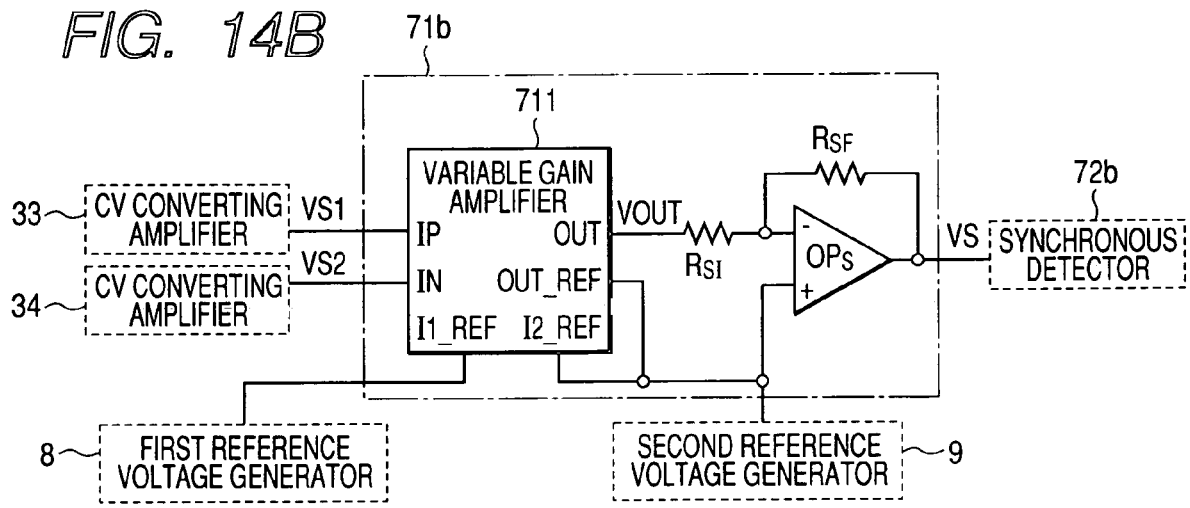

Although the differential amplifier 71b shown in FIG. 13 is simpler in structure than the differential amplifier 71b shown in FIG. 11 (the number of the resistors in the structure shown in FIG. 13 is less by three than that in the structure shown in FIG. 11), it can perform the same function as the differential amplifier 71b shown in FIG. 11. As shown in FIG. 14A, FIG. 14B, each of the differential amplifiers 71b shown in FIG. 11 and FIG. 13 may be constituted by an amplifier whose gain has not the temperature dependency. More specifically, the resistors $R_{DS2A}$ and $R_{DS2B}$ may be replaced by the resistor $R_{DS2}$, the resistors $R_{DS4A}$ and $R_{DS4B}$ may be replaced by the resistor $R_{DS4}$, and the resistors $R_{SFA}$ and $R_{SFB}$ may be replaced by the resistor RSF, if the IV converter circuit 719 of the variable gain amplifier 711 has a temperature characteristic.

Figure 14C:
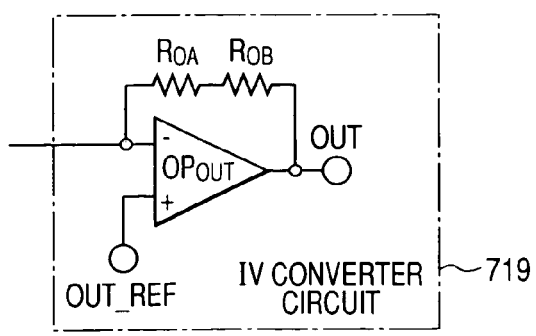

In this case, the IV converter circuit 719 may have a structure as shown in FIG. 14C where the resistor $R_O$ is replaced by a series of a thin film resistor $R_{OA}$ having a small temperature coefficient and a diffused resistor $R_{OB}$ having a large temperature coefficient. The gain of the variable gain amplifier 711 in this case is given by the equation (76).

$$G_{VG} = \frac{R_{OA} + R_{OB}}{R_{IN}} \cdot \frac{R_{I1\_REF}}{R_{I2\_REF}} \cdot \frac{VrefB}{VrefA} \quad (76)$$

Although the differential amplifier 71b is configured to have the gain having the temperature characteristic in the third embodiment, the adjustment/amplification circuit 74 may be configured to have a gain having the temperature characteristic instead of the differential amplifier 71b.

Fourth Embodiment

Next, a gyro sensor according to a fourth embodiment of the invention is explained.

Figure 15A:
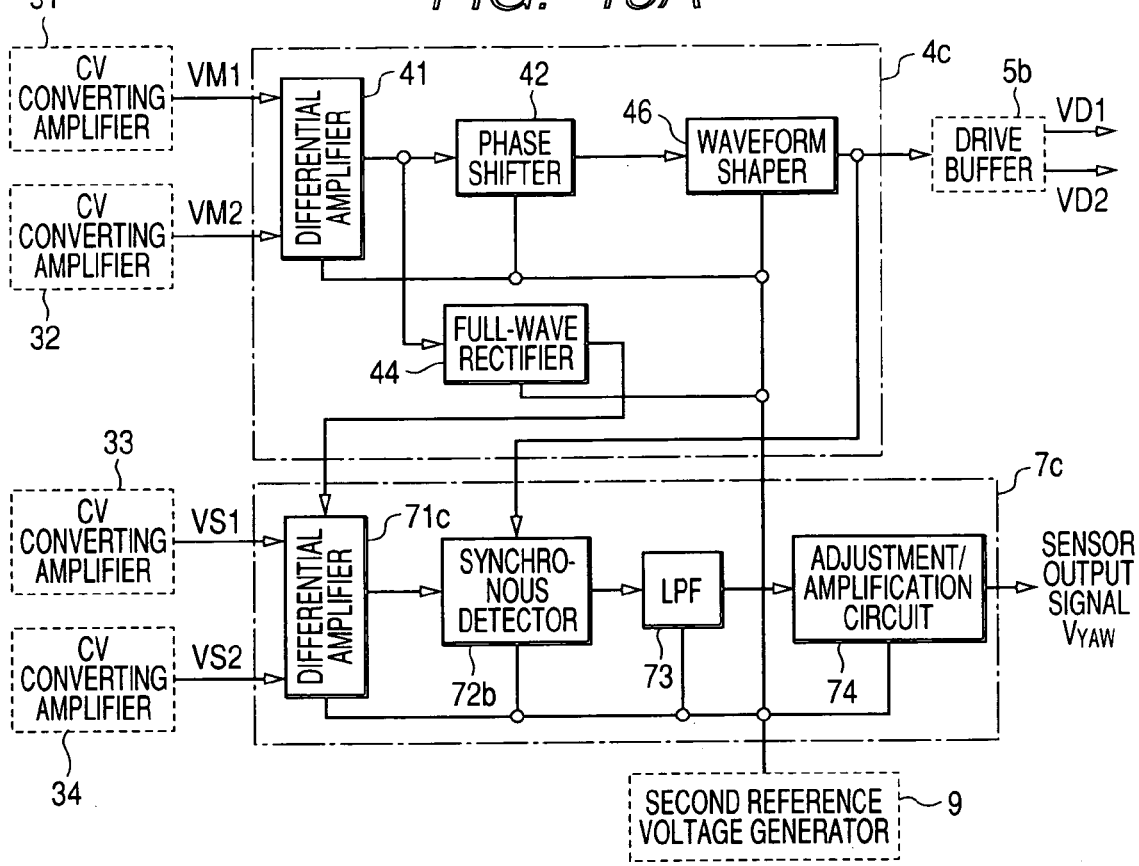
FIG. 15A is a block diagram showing an essential part of a gyro sensor according to a fourth embodiment of the invention.

The following explanation focuses on the difference in structure between the third embodiment and the fourth embodiment. As shown in FIG. 15A, in the fourth embodiment, the drive signal controller 4c includes, in addition to the differential amplifier 41, phase shifter 42 and waveform shaper 46, the full-wave rectifier 44 full-wave rectifying the composite monitor signal VM(t) outputted from the differential amplifier 41. And the sensor output signal generator 7c includes, in addition to the synchronous detector circuit 72b, low-pass filter 73 and adjustment/amplification circuit 74, a differential amplifier 71c whose gain varies in accordance with the detection signal $V_{FWR}$ (see equation (48)) outputted from the full-wave rectifier 44 as a replacement of the differential amplifier 71.

Figure 16:
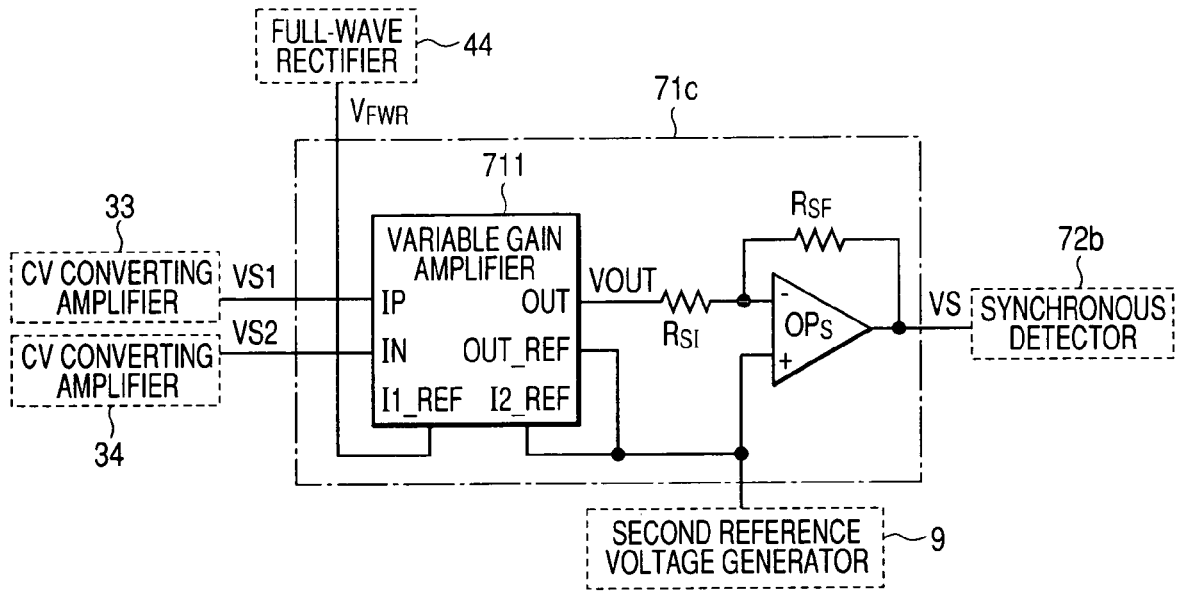
FIG. 16 is a circuit diagram showing a structure of a differential amplifier of a sensor output signal generator of the gyro sensor according to the fourth embodiment of the invention.
Figure 17:
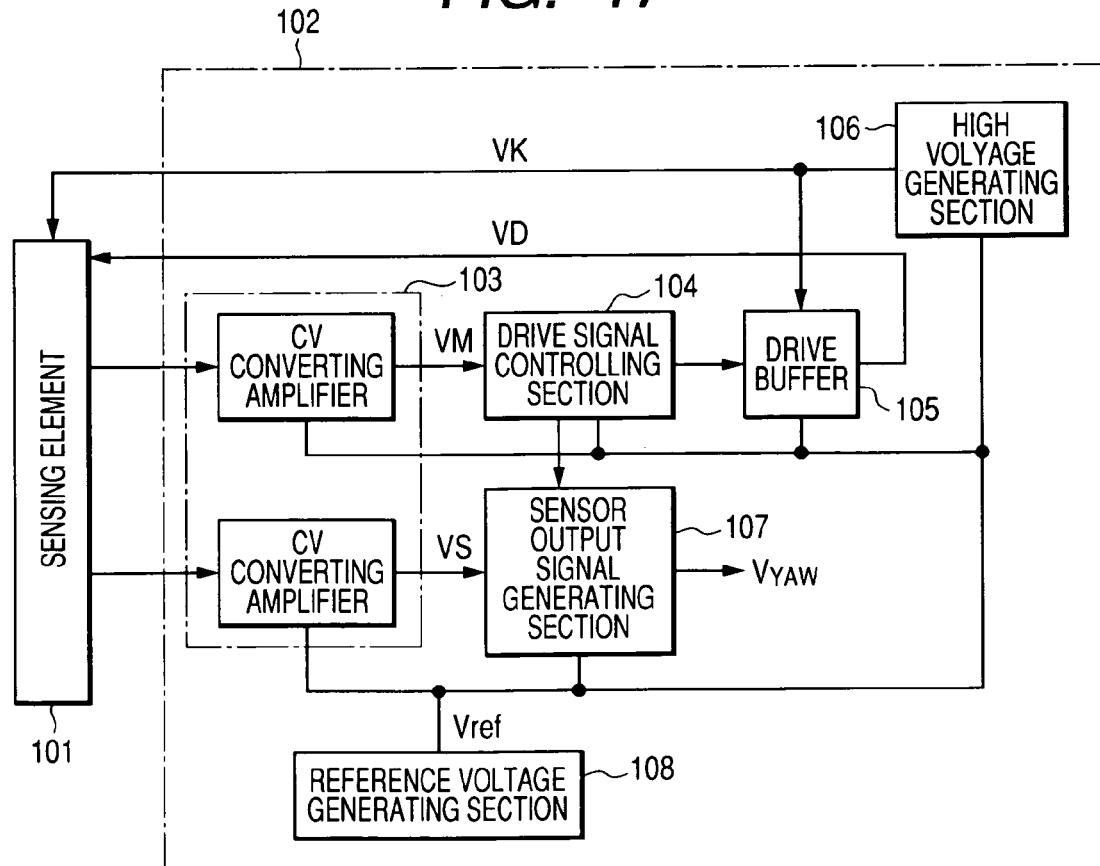
FIG. 17 is a block diagram showing a structure of a conventional gyro sensor.

As shown in FIG. 16, the differential amplifier 71c is constituted by the variable gain amplifier 711, and the operational amplifier $OP_S$ applied with the output from the terminal OUT of the variable gain amplifier 711 at its inverting input terminal through the resistor $R_{Si}$, and applied with the second reference voltage VrefB at its non-inverting input terminal, the output terminal and the inverting input terminal being connected to each other through the resistor $R_{SF}$.

The variable gain amplifier 711 has exactly the same structure as shown in FIG. 12. That is, the variable gain amplifier 711 has the terminals IP, IN applied with the sense signals VS1(t), VS2(t), respectively, terminals OUT_REF, I2_REF applied with the second reference voltage VrefB, and terminal I1_REF applied with the detection signal $V_{FWR}$ outputted from the full-wave rectifier 44.

The gain $G_{VG}$ of the variable gain amplifier 711 is given by the equation (77).

$$G_{VG} = \frac{R_O}{R_{IN}} \cdot \frac{R_{I1\_REF}}{R_{I2\_REF}} \cdot \frac{VrefB}{V_{FWR}} \quad (77)$$

As apparent form the equation (77), the gain $G_{VG}$ of the variable gain amplifier 711 is inversely proportional to the detection signal $V_{FWR}$ which is proportional to the amplitude xDa of the displacement of the movable part 11 along the x-axis, and varies in proportion to the second reference voltage VrefB (=VCC/2).

Accordingly, if the amplitude xDa becomes small for some reason, and eventually the detection signal $V_{FWR}$ becomes small, the gain $G_{VG}$ become large. Contrarily, if the amplitude xDa becomes large for some reason, and eventually the detection signal $V_{FGR}$ becomes large, the gain $G_{VG}$ becomes small. Hence, the change of the element sensitivity of the sensing element 1 due to the change of the amplitude xDa can be compensated for.

Furthermore, since the gain $G_{VG}$ varies depending on the power supply voltage VCC, if the A/D conversion ratio is changed due to the variation of the power supply voltage VCC, it is possible to change the sensitivity of the sense signal VS(t), and consequently the sensitivity of the sensor output signal $V_{YAW}$ by the same ratio as the change of the A/D conversion ratio.

Figure 15B:
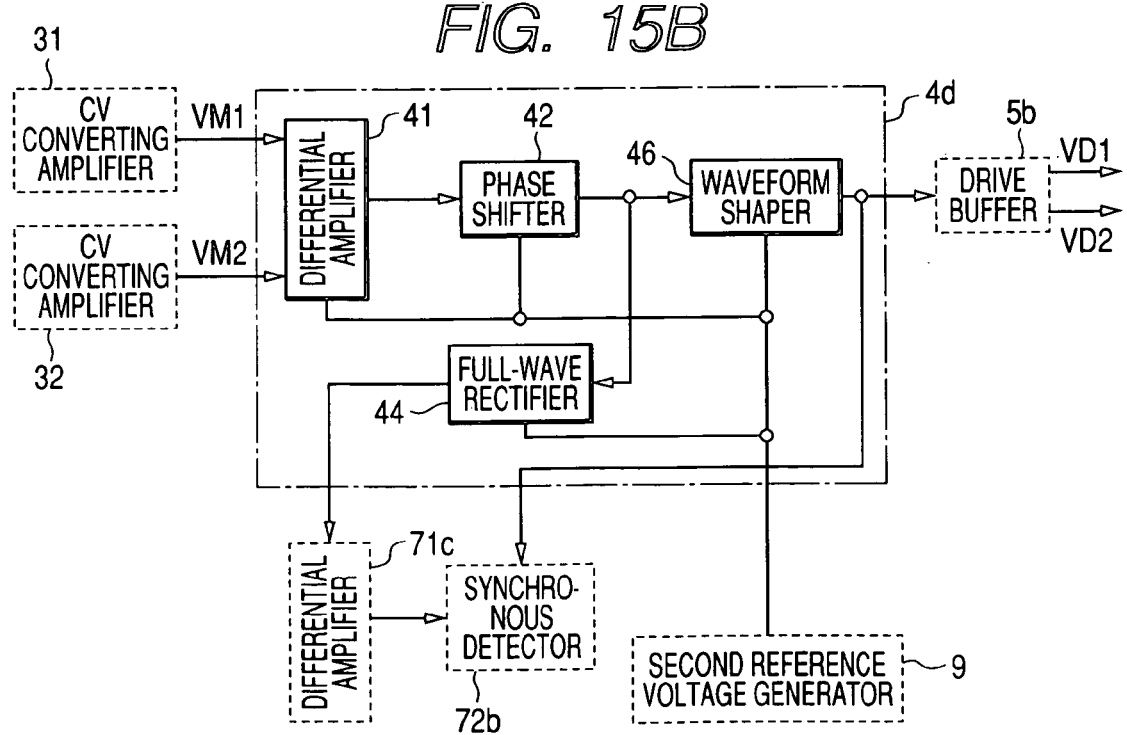
FIG. 15B is a block diagram showing an essential part of a variant of the gyro sensor according to the fourth embodiment of the invention.

Although the full-wave rectifier 44 is configured to rectify the composite monitor signal VM(t) outputted form the differential amplifier 41 in the fourth embodiment, it may be configured to rectify the shift signal VPS(t) outputted from the phase shifter 42 as shown in FIG. 15B.

Also, the gain of the differential amplifier 71c is adjusted on the basis of the detection signal $V_{FWR}$ in the fourth embodiment, the gain of the adjustment/amplification circuit 74 may be adjusted on the basis of the detection signal $V_{FWR}$ instead of the differential amplifier 71c. The configuration has the same advantage as the second embodiment.

The above explained preferred embodiments are exemplary of the invention of the present application which is described solely by the claims appended below. It should be understood that modifications of the preferred embodiments may be made as would occur to one of skill in the art.

What is claimed is:

1. An electrostatically-driven/capacitance-detection type gyro sensor comprising:
    a sensing element including
        a movable part displaceable in a motion plane,
        a first electrode provided in said movable part and applied with a bias voltage;
        a second electrode applied with a drive signal to generate an electrostatic force acting on said movable part in order that said movable part vibrates along a first direction on said motion plane,
        a third electrode forming a first variable capacitor with said movable part, a capacitance of said first variable capacitor varying in accordance with a displacement of said movable part along said first direction, and
        a fourth electrode forming a second variable capacitor with said movable part, a capacitance of said second variable capacitor varying in accordance with a displacement of said movable part along a second direction on said motion plane, said second direction being orthogonal to said first direction;
    a reference voltage generator generating, from a power supply voltage supplied from outside said gyro sensor, a reference voltage which is constant irrespective of variation of said power supply voltage;
    a bias voltage generator generating said bias voltage by amplifying said reference voltage;
    a capacitance-voltage converter converting said capacitance of said first variable capacitor into a first voltage signal whose voltage level varies following variation of said capacitance of said first variable capacitor, the first voltage signal having a first offset voltage proportional to the reference voltage, and converting said capacitance of said second variable capacitor into a second voltage signal whose voltage level varies following variation of said capacitance of said second variable capacitor, the second voltage signal having a second offset voltage proportional to the reference voltage;
    a drive signal generator generating said drive signal by amplifying and phase-adjusting said first voltage signal, said drive signal having an offset voltage proportional to said reference voltage; and
    a sensor output signal generator generating, from said second voltage signal, a sensor output signal having a magnitude corresponding to said voltage level of said second voltage signal, said sensor output signal having an offset voltage proportional to said power supply voltage.

2. The gyro sensor according to claim 1, wherein said drive signal generator includes
    a phase shifter for phase-shifting said first voltage signal in order that said drive signal has a phase allowing said movable part to continue to vibrate along said first direction, and
    an amplifier for amplifying said first voltage signal in order that said drive signal has such an amplitude that an amplitude of displacement of said movable part along said first direction is kept at a target value proportional to the power supply voltage.

3. The gyro sensor according to claim 1, wherein said drive signal generator includes
    a phase shifter for phase-shifting said first voltage signal in order that said drive signal has a phase allowing said movable part to continue to vibrate along said first direction, and
    an amplifier for amplifying said first voltage signal in order that said drive signal has such an amplitude that an amplitude of displacing velocity of said movable part along said first direction is kept at a target value proportional to the power supply voltage.

4. The gyro sensor according to claim 1, wherein
    said drive signal generator includes a phase shifter for phase-shifting said first voltage signal in order that said drive signal has a phase allowing said movable part to continue to vibrate along said first direction, and
    said sensor output signal generator includes an amplifier amplifying said second voltage signal, said amplifier having a gain which is proportional to said power supply voltage and has a temperature characteristic compensating for a temperature characteristic of said second voltage signal.

5. The gyro sensor according to claim 1, wherein
    said drive signal generator includes a phase shifter for phase-shifting said first voltage signal in order that said drive signal has a phase allowing said movable part to continue to vibrate along said first direction, and
    said sensor output signal generator includes an amplifier amplifying said second voltage signal, said amplifier having a gain which is inversely proportional to an amplitude of said first voltage signal and proportional to said power supply voltage.

6. The gyro sensor according to claim 1, wherein,
said drive signal generator includes a phase shifter for phase-shifting said first voltage signal by differentiating said first voltage signal in order that said drive signal has a phase allowing said movable part to continue to vibrate along said first direction, and
said sensor output signal generator includes an amplifier amplifying said second voltage signal, said amplifier having a gain which is inversely proportional to an amplitude of a derivative of said first voltage signal and proportional to said power supply voltage.

7. The gyro sensor according to claim 1, wherein, if the power supply voltage fluctuates, the offset voltage maintains a fixed proportional value with respect to the power supply voltage.

8. An electrostatically-driven/capacitance-detection type gyro sensor comprising:
a sensing element including
a movable part displaceable in a motion plane,
a first electrode provided in the movable part and applied with a bias voltage;
a second electrode applied with a drive signal to generate an electrostatic force acting on the movable part in order that the movable part vibrates along a first direction on the motion plane,
a third electrode foaming a first variable capacitor with the movable part, a capacitance of the first variable capacitor varying in accordance with a displacement of the movable part along the first direction, and
a fourth electrode foaming a second variable capacitor with the movable part, a capacitance of the second variable capacitor varying in accordance with a displacement of the movable part along a second direction on the motion plane, the second direction being orthogonal to the first direction;
a reference voltage generator generating, from a power supply voltage supplied from outside the gyro sensor, a reference voltage which is constant irrespective of variation of the power supply voltage;
a bias voltage generator generating the bias voltage by amplifying the reference voltage;
a capacitance-voltage convener converting the capacitance of the first variable capacitor into a first voltage signal whose voltage level varies following variation of the capacitance of the first variable capacitor, the first voltage signal having a first offset voltage proportional to the reference voltage, and converting the capacitance of the second variable capacitor into a second voltage signal whose voltage level varies following variation of the capacitance of the second variable capacitor, the second voltage signal having a second offset voltage proportional to the reference voltage;
a drive signal generator generating the drive signal by amplifying and phase-adjusting the first voltage signal, the drive signal having an offset voltage proportional to the reference voltage; and
a sensor output signal generator generating, from the second voltage signal, a sensor output signal having a magnitude corresponding to the voltage level of the second voltage signal, the sensor output signal having an offset voltage that is derived from the power supply voltage and is proportional to the power supply voltage.

9. The gyro sensor according to claim 8, wherein the drive signal generator includes
a phase shifter for phase-shifting the first voltage signal in order that the drive signal has a phase allowing the movable part to continue to vibrate along the first direction, and
an amplifier for amplifying the first voltage signal in order that the drive signal has such an amplitude that an amplitude of displacement of the movable part along the first direction is kept at a target value proportional to the power supply voltage.

10. The gyro sensor according to claim 8, wherein the drive signal generator includes
a phase shifter for phase-shifting the first voltage signal in order tat the drive signal has a phase allowing the movable part to continue to vibrate along the first direction, and
an amplifier for amplifying the first voltage signal in order that the drive signal has such an amplitude that an amplitude of displacing Velocity of the movable part along the first direction is kept at a target value proportional to the power supply voltage.

11. The gyro sensor according to claim 8, wherein
the drive signal generator includes a phase shifter for phase-shifting the first voltage signal in order that the drive signal has a phase allowing the movable part to continue to vibrate along the first direction, and
the sensor output signal generator includes an amplifier amplifying the second voltage signal, the amplifier having a gain which is proportional to the power supply voltage and has a temperature characteristic compensating for a temperature characteristic of the second voltage signal.

12. The gyro sensor according to claim 8,
wherein the drive signal generator includes a phase shifter for phase-shifting the first voltage signal in order that the drive signal has a phase allowing the movable part to continue to vibrate along the first direction, and
wherein the sensor output signal generator includes an amplifier amplifying the second voltage signal, the amplifier having a gain which is inversely proportional to an amplitude of the first voltage signal and proportional to the power supply voltage.

13. The gyro sensor according to claim 8,
wherein the drive signal generator includes a phase shifter for phase-shifting the first voltage signal by differentiating the first voltage signal in order that the drive signal has a phase allowing the movable part to continue to vibrate along the first direction, and
wherein the sensor output signal generator includes an amplifier amplifying the second voltage signal, the amplifier having a gain which, is inversely proportional to an amplitude of a derivative of the first voltage signal and proportional to the power supply voltage.

14. The gyro sensor according to claim 8, wherein, if the power supply voltage fluctuates, the offset voltage maintains a fixed proportional value with respect to the power supply voltage.

* * * * *